United States Patent
Philpott et al.

(10) Patent No.: US 7,065,420 B1
(45) Date of Patent: Jun. 20, 2006

(54) INTEGRATED REAL-TIME FEATURE BASED COSTING

(75) Inventors: Michael L. Philpott, Seymour, IL (US); R. Sebastian Schrader, Waltham, MA (US); Gautam Subbarao, Louisville, KY (US); Eric A. Hiller, Ayer, MA (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 10/993,406

(22) Filed: Nov. 19, 2004

Related U.S. Application Data

(60) Provisional application No. 60/523,746, filed on Nov. 20, 2003.

(51) Int. Cl.
*G06F 19/00* (2006.01)
*G06F 17/50* (2006.01)

(52) U.S. Cl. ............................................. 700/97; 703/1
(58) Field of Classification Search .................. 700/97, 700/98; 703/1
See application file for complete search history.

(56) References Cited

U.S. PATENT DOCUMENTS

| | | | |
|---|---|---|---|
| 5,249,120 A | 9/1993 | Foley | 364/401 |
| 5,552,995 A * | 9/1996 | Sebastian | 700/97 |
| 5,655,087 A * | 8/1997 | Hino et al. | 705/29 |
| 5,793,632 A | 8/1998 | Fad et al. | 364/464.1 |
| 5,799,286 A | 8/1998 | Morgan et al. | 705/30 |
| 5,880,959 A * | 3/1999 | Shah et al. | 700/97 |
| 5,970,476 A | 10/1999 | Fahey | 705/28 |
| 6,223,092 B1 * | 4/2001 | Miyakawa et al. | 700/103 |
| 6,341,243 B1 * | 1/2002 | Bourne et al. | 700/165 |
| 6,507,825 B1 | 1/2003 | Suh | 705/30 |
| 6,633,854 B1 | 10/2003 | Moore | 703/13 |
| 6,775,647 B1 * | 8/2004 | Evans et al. | 703/7 |
| 2001/0016803 A1 * | 8/2001 | Sartiono et al. | 703/1 |
| 2001/0023418 A1 * | 9/2001 | Suzuki et al. | 705/400 |
| 2005/0120010 A1 * | 6/2005 | Philpott et al. | 707/3 |

OTHER PUBLICATIONS

Subbarao, G. et al., "Feature Based Costing (FBC) of Welded Assemblies: A Genetic Approach", Proceedings of IMECE'02 2002 ASME International Mechanical Engineering Congress & Exposition, New Orleans, LA, Nov. 17, 2002.

Schrader, R.S. et al, "A Genetic Algorithm for Cost Estimating Turned Parts in an Interqctive DFM Environment", Proceedings of DETC'03, ASME 2003 International Design, Chicago, IL, Sep. 2, 2003.

(Continued)

*Primary Examiner*—Leo Picard
*Assistant Examiner*—Ryan A. Jarrett
(74) *Attorney, Agent, or Firm*—Bromberg & Sunstein LLP

(57) ABSTRACT

A system and method for automatically estimating the optimized cost of a part during the course of design of the part on a computer-aided design (CAD) system by a designer. The method includes extracting parametric features of a current design from the CAD system. Manufacturing cost drivers are identified on the basis of the parametric features. The manufacturing cost drivers are translated into costs using process models. The costs are simultaneously optimized with respect to a plurality of operations within specified machine constraints using an algorithm with dynamically linked structures to obtain estimates of optimized costs and cost reasoning. An estimate of optimized costs and cost reasoning is fed back to the designer as an output display on an output device.

76 Claims, 26 Drawing Sheets

OTHER PUBLICATIONS

Zych, J., "Algorithms, Abstract Data Types and Lists", Data Structure and Software Principles Lecturing Material, CS225, 1998, University of Illinois at Urbana-Champaign.

Hiller, E.A., "Parametric Cost Modeling: An application to Sheet Metal", MS Thesis, 1997; University of Illinois at Urbana-Champaign.

Marini, M.V., "Parametric Modeling for Early Cost Estimation of Sheet Metal Parts", M.S. Thesis, 1999: University of Illinois at Urbana-Champaign.

Schrader, R.S., "Feature Based Costing of Sheet Metal and Axisymmetric Turned Parts", M.S. Thesis, 2003, University of Illinois at Urbana-Champaign.

Falcidieno and Giannini, "Automatic Recognition and Representation of Shape-Based Features in a Geometric Modeling System", Computer Vision Graph. Image Process, 48 (1989), pp. 93-123.

Boothroyd and Reynolds, "Approximate Cost Estimates for Typical Turned Parts", Journal of Manufacturing Systems, vol. 8, No. 3, 1989, pp. 185-193.

Dereli, Filiz and Baykasoglu, "Optimizing Cutting Parameters in Process Planning of Prismatic Parts by using Genetic Algorithms", International Journal of Production Research, 2001, vol. 39, No. 15, pp. 3303-3328.

Michaels and Wood, "Design to Cost", Copyright © 1989 by John wiley & Sons, Inc., pp. 1-401.

Goldberg, "Genetic Algorithms in Search Optimization and Machine Learning", Copyright © 1989 by Addison-Wesley Publishing Co., Inc., pp. 1-379.

Subbarao, "Feature Based Costing of Welded Asemblies and Turned Parts", M.S. Thesis, 2002, pp. 1-179.

Khan et al., "Machining Condition Optimization by Genetic Algorithms and Simulated Annealing", Computers in Operation Research, 24(7) 1996, pp. 647-657.

Regli, "A Survery of Automated Feature Recognition Techniques", Department of Computer Science and Systems Research Center, U. of Maryland, 1992, pp. 1-12.

Kraus et al., "Midmarket Survey Show Manufacturers Have Been Slow to Embrace PLM", AMR Research Reports, Oct. 3, 2003, pp. 1-6.

* cited by examiner

FBC | Part <bracket_1> | Close

INITIAL CONDITIONS | PART COST

> COST SUMMARY
> CYCLE TIME
> COST DETAIL
> TOOLING COST
> COST DRIVERS
> PROPERTIES

MFG TIME FOR EACH PROCESS (std min) — 401
RECOMMENDED PROCESS -> HARD TOOLING

Category          Current
Process           Hard Tooling

PROCESS TIME:     CTL     SHEAR   PRESS   T
Cycle Time        0.059   0.134   0.060   0
Incentive Time    0.077   0.172   0.203   0

Category          Previous
Process           Laser Cutter  2000  Watts

PROCESS TIME:     CTL     LASER   BEND    T
Cycle Time        0.059   0.982   0.159   1
Incentive Time    0.077   3.192   0.225   3

Help Info >>
website: www.FBCost.com

FIG. 4

| FBC | Part <bracket_1> | | Close |
|---|---|---|---|
| INITIAL CONDITIONS | PART COST | | |

> COST SUMMARY

> CYCLE TIME

> COST DETAIL

> TOOLING COST

> COST DRIVERS

> PROPERTIES

COST INFORMATION FOR EACH PROCESS — 501

```
Process            Hard Tooling
PROCESS COST :  MATL  CTL  SHEAR  PRESS
Material           2.09
Paint Matl         1.18
Direct Labor             0.02  0.05   0.19
MFG Dir O/H              0.16  0.26   0.55
MFG Dir Cost       2.09  0.19  0.31   0.68

Process            Laser Cutter  2000 Watts
PROCESS COST :  MATL  CTL  LASER  BEND
Material           2.09
Paint Matl         1.18
Direct Labor             0.02  0.94   0.07
MFG Dir O/H              0.16  2.70   0.18
MFG Dir Cost       2.09  0.19  3.35   0.25
```

Help Info >> website: www.FBCost.com

FIG. 5

| Help | LIST OF AVAILABLE MATERIALS | × |
|---|---|---|

| | | Thick | Width | Length | Cost $/kg |
|---|---|---|---|---|---|
| 1020 CR | – | Thick | Width | Length | Cost $/kg |
| | | 6.0 | 1110 | 1320 | 0.4684 |
| | | | 1110 | 1600 | 0.4684 |
| | | | 1110 | 2500 | 0.4684 |
| | | | 1110 | 3000 | 0.4684 |
| | | 6.4 | 1180 | 3000 | 0.4717 |
| | | | 1180 | 1345 | 0.4717 |
| | | 8.0 | 479.3 | 1910 | 0.5948 |
| 1040 CR | – | Thick | Width | Length | Cost $/kg |
| | | 3.0 | 1206.5 | 1829 | 0.6227 |
| | | 4.0 | 415 | 1118 | 0.5290 |
| 3034 HR | – | Thick | Width | Length | Cost $/kg |
| | | 1.2 | 689.4 | 1524 | 1.8078 |
| | | 1.6 | 1219.2 | 3048 | 1.7780 |
| | | 2.0 | 914.4 | 2438.4 | 1.7780 |
| | | | 1066.8 | 3048 | 1.7593 |
| | | 3.0 | 914.4 | 1524 | 1.7797 |
| 3060 HR | – | Thick | Width | Length | Cost $/kg |
| | | 3.0 | 1025 | 1320 | 0.4995 |
| | | | 1025 | 2550 | 0.4995 |
| | | | 1025 | 2555 | 0.4995 |

| FBC | Sheet Metall Batch Cost Estimation | | | Close |

SELECTION INFO

| STATUS | PART # | -> | PATH |
|---|---|---|---|
| Retrieve | OK | h165724.1 | -> | C:\FBC_DEMO\Sheet Metal |
| Retrieve | OK | h165673.1 | -> | C:\FBC_DEMO\Sheet Metal |
| Retrieve | OK | h163608.1 | -> | C:\FBC_DEMO\Sheet Metal |
| Retrieve | OK | h160987.1 | -> | C:\FBC_DEMO\Sheet Metal |
| Retrieve | OK | h159173.1 | -> | C:\FBC_DEMO\Sheet Metal |
| Retrieve | OK | h159077.1 | -> | C:\FBC_DEMO\Sheet Metal |
| Retrieve | OK | h159076.1 | -> | C:\FBC_DEMO\Sheet Metal |
| Retrieve | OK | h158486.1 | -> | C:\FBC_DEMO\Sheet Metal |
| Retrieve | OK | h158485.1 | -> | C:\FBC_DEMO\Sheet Metal |
| Retrieve | OK | h157780.1 | -> | C:\FBC_DEMO\Sheet Metal |
| Retrieve | OK | h157779.1 | -> | C:\FBC_DEMO\Sheet Metal |
| Retrieve | OK | h157772.1 | -> | C:\FBC_DEMO\Sheet Metal |
| Retrieve | OK | h157770.1 | -> | C:\FBC_DEMO\Sheet Metal |
| Retrieve | OK | h157520.2 | -> | C:\FBC_DEMO\Sheet Metal |

OK Parts: 14   ER Parts: 0

Excel File: C:\FBC_DEMO\Sheet Metal\Fbc_Cost.xls

PART SELECTION
☐ Single  ☒ Multiple

COST ESTIMATION
☑ Only the Latest Version

PRODUCTION VOLUME
Annual Volume: 5500
Number of Years: 5

MANUFACT PROCESS
⦿ Lowes Cost Process
○ Turret Press
○ Laser Cutter
○ Plasma Cutter
○ Hard Tooling

RESET

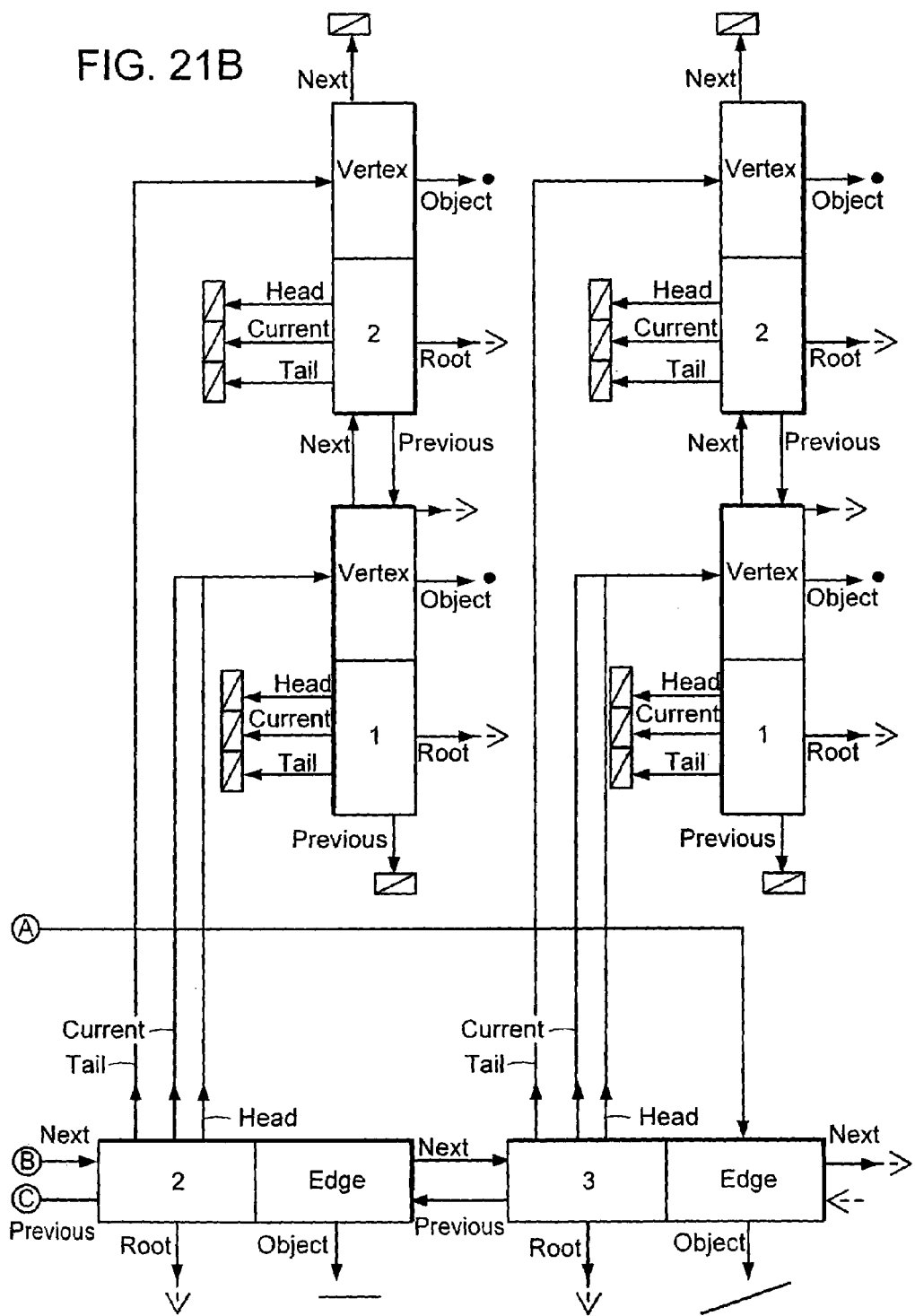

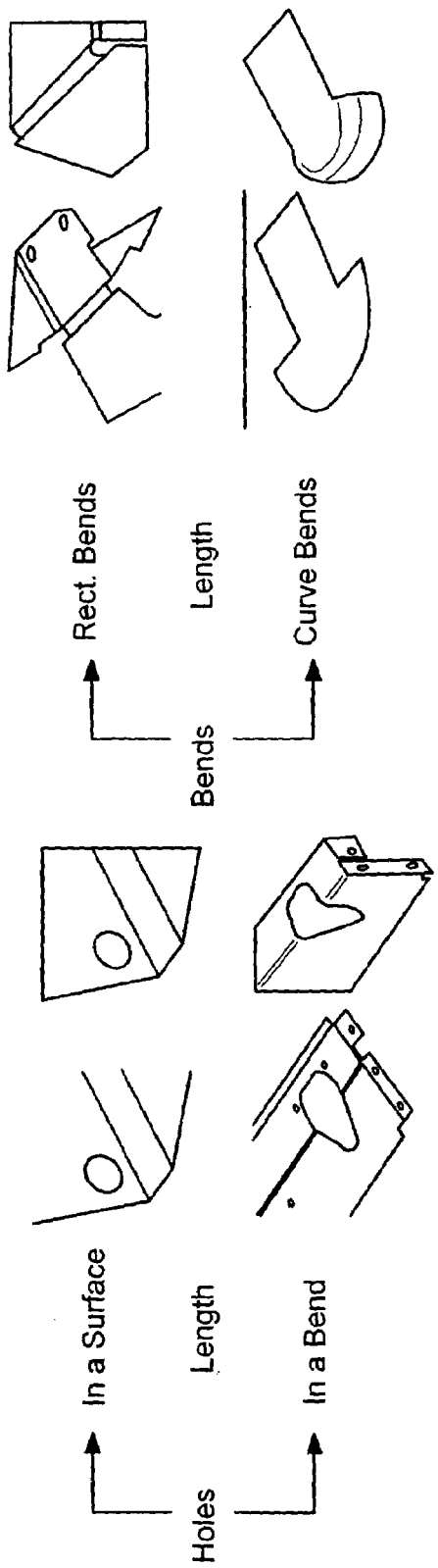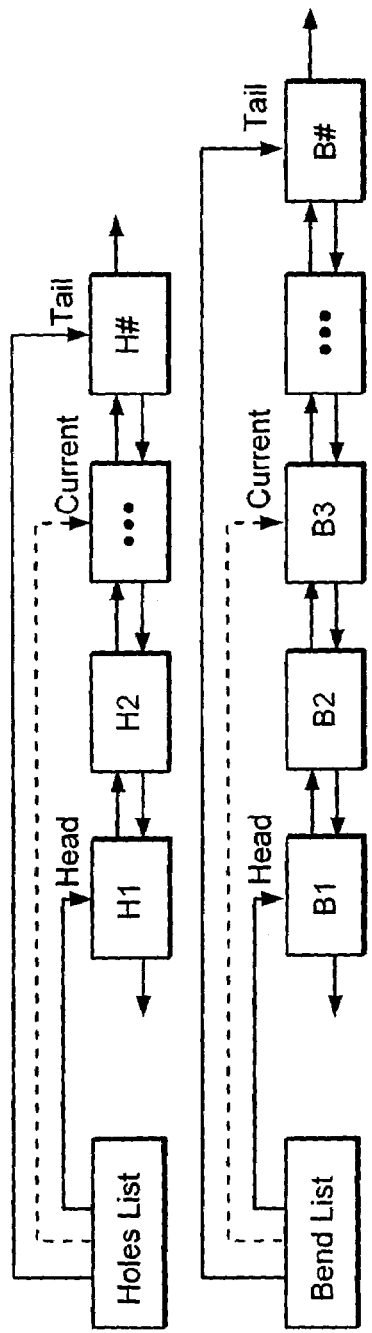
FIG. 22

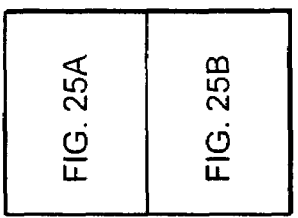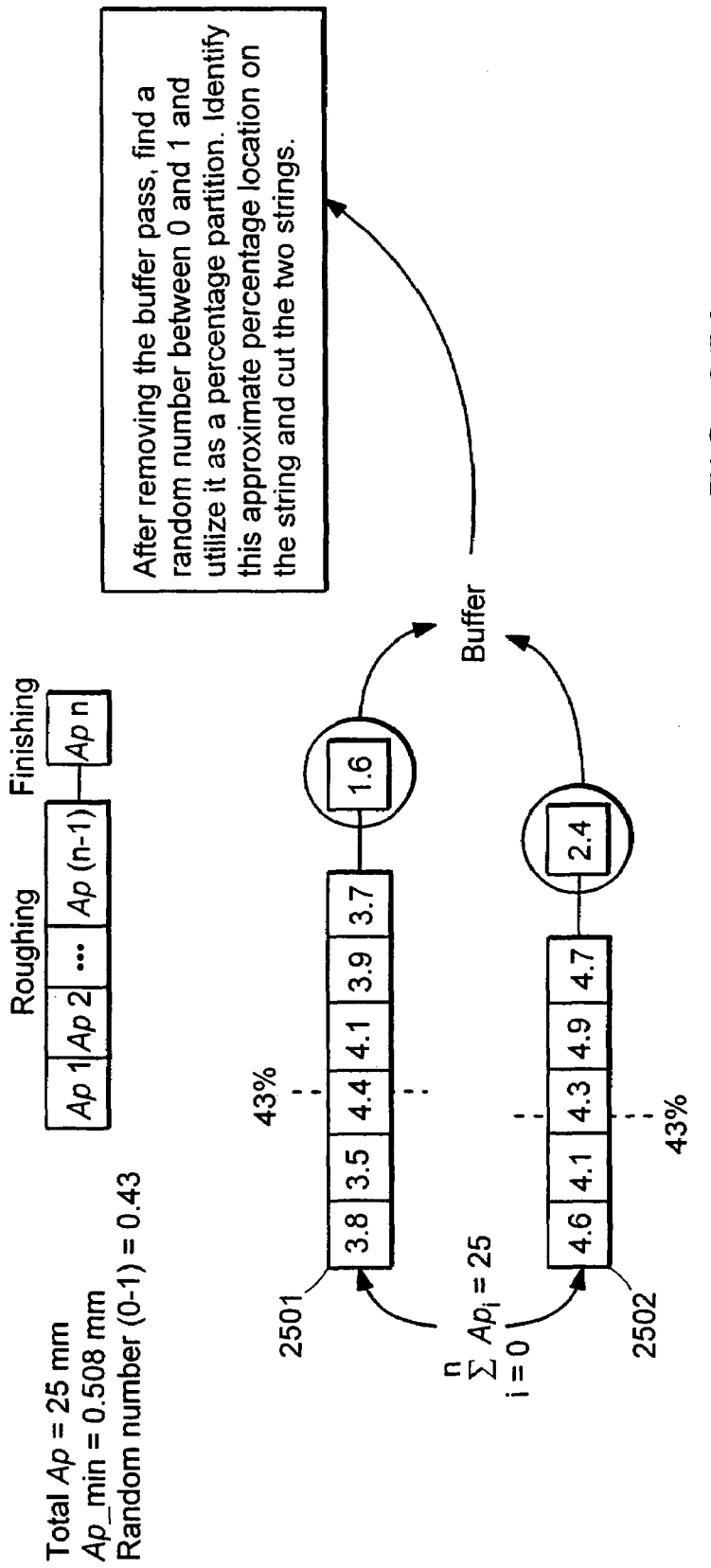
FIG. 25A

INTEGRATED REAL-TIME FEATURE BASED COSTING

CROSS REFERENCE TO RELATED APPLICATIONS

This application claims priority from U.S. provisional patent application Ser. No. 60/523,746, entitled "Integrated Real-Time Feature Based Costing (FBC)," filed Nov. 20, 2003, which is hereby incorporated by reference, in its entirety.

TECHNICAL FIELD

The invention relates generally to manufacturing cost estimation and more particularly, to real-time feature based costing (FBC) integrated into a computer aided design (CAD) system.

BACKGROUND ART

A large fraction of a part's cost is decided early in product development by the design choices that engineers make. However, little information on cost is available until the design is completed and the company begins manufacturing the part. The lack of early manufacturing cost information in the design process prevents engineers from making timely decisions that minimize the cost of their parts. This in turn translates into large additional manufacturing costs during the life cycle of a product. These additional costs can be avoided if engineers have a tool to quickly and accurately estimate production and tooling costs early in the design process. Also, with such a tool engineers are able to optimize the cost and performance of their designs simultaneously.

The need for good cost estimation tools is exemplified by a recent survey of 150 US companies on the adequacy of their product development processes. Cost estimation was the number one area lacking in capability and in need of investment, and it came out almost twice as important as the next area of concern (Kraus, B. and O'Marah, K. "Midmarket Survey Shows Manufacturers Have Been Slow to Embrace PLM" AMR Research Reports, Oct. 3, 2003). PLM or Product Lifecycle Management is a rapidly growing set of CAD based enabling tools aimed at marshalling the skills, expertise, knowledge, and experience of the enterprise and applying them to every major stage in the product lifecycle to achieve competitive excellence. Designers use 3D CAD systems or solid modelers to fully define the geometry and form of a discrete part that is to be designed. Designers also use 3D CAD systems to specify an assembly of parts and in the process provide details on the geometry and form of any devices or materials used to join parts into an assembly, such as weld depositions and reinforcements. Other parameters such as raw material type and specification are also specified and contained in the model description of the part.

Cost estimating methodologies range from simple parametric systems based on a single attribute, such as weight, to complex systems requiring multiple components or process parameters, to the complete and detailed routing of the part through a production system. Most companies today use a variety of in-house techniques to estimate costs, usually database or spreadsheet systems that allocate costs according to activity based costing (ABC) principles. A number of commercial costing systems are available utilizing these same ABC principles (Starn, ABC Tools, Net Prophet, and Activity Analyzer). ABC based cost estimates are determined by routing parts through the production system and attempting to determine the actual cost of manufacture. Using this approach to estimate costs is time consuming and without actually producing the parts inaccurate. This is because processing times and labor handling times must be estimated based on the experience of a manufacturing engineer or cost estimating engineer.

Other commercial cost estimating systems, such as Boothroyd and Dewhurst and Cognition use process-driven models to estimate processing time. These process driven models use industry averages to determine times and costs, although usually they have some capability to change some parameters to accommodate difference in companies' manufacturing systems and methods. Another commercial cost estimating system, Galorath's SEER, uses parametric component based cost estimating approaches based on historical cost information of similar parts. This method is only applicable to a specific kind of part (e.g. missile tubes or an air foil) but can not be readily used by designers working on new or significantly different components. Existing cost systems are not fully CAD integrated and do not provide functionality for feature by feature cost feedback to the user in real time as he designs a part or assembly of parts.

Genetic Algorithms (GAs) are search algorithms based on the Darwinian theory of evolution, and incorporate mechanics of natural selection and evolution found in biological systems. Genetic algorithms use a population, where each member of the population is represented by a genetic string. This string in turn defines the fitness or performance of a particular member of the population. A GA starts with a parent population and generates successive populations by performing genetic operations. High fitness strings in the population are first selected for reproduction. Genetic algorithms and various genetic operators are described in Goldberg, D. E., 1989, "Genetic Algorithms in Search Optimization and Machine Learning," Addison Wesley Longman, which is hereby incorporated by reference, in its entirety. GAs are members of the class of robust schemes capable of searching combinatorial, unimodal, and multimodal problem types with a very high efficiency. The mechanics of a GA make it a highly adaptive search technique, which also relaxes required prior knowledge of the solution space.

Therefore, a method benefiting from the advantages of GA and thus not requiring modeling by a set of discrete nonlinear equations, as has hitherto been the case, would be highly desirable. Particular algorithmic features which allow GA to be applied effectively in the context of feature based costing are thus discussed below in the description of the invention.

SUMMARY OF THE INVENTION

A methodology for automatically estimating the manufacturing cost of parts, and assemblies of parts, in real time integrated into a 3D CAD system is provided in accordance with various embodiments of the invention. A designer is able to obtain cost estimates feature by feature as a part or assembly of parts is designed. The methodology utilizes a combination of innovative memory management techniques during CAD model regeneration and genetic algorithms to rapidly search through possible combinations of tool paths and routings to arrive at the lowest cost method of processing the part. Lowest cost optimization is achieved at the individual process or routing level. This enables the user of a CAD system to find the most cost effective method of manufacture in real time, feature by feature, as the part is designed. Because cost estimates are typically achieved in less than 2 seconds, the designer is able to complete the design task without being hindered by the cost estimating system. Also, because the methodology provides for much higher speeds than other existing cost estimating systems, it is now possible to perform a large number of what-if design experiments. In this manner, a unique vehicle is provided for achieving an optimized economic solution during the early design phases of a project.

In accordance with one aspect of the invention, there is provided a method of automatically estimating the optimized cost of a part during the course of design of the part on a computer-aided design (CAD) system by a designer. The method includes extracting parametric features of a current design from the CAD system. Manufacturing cost drivers are identified on the basis of the parametric features. Using process models, the manufacturing cost drivers are translated into costs. The costs are simultaneously optimized with respect to a plurality of operations within specified machine constraints using an algorithm with dynamically linked structures to obtain estimates of optimized costs and cost reasoning. An estimate of optimized costs and cost reasoning is fed back to the designer as an output display on an output device.

In accordance with another aspect of the invention, there is provided a program storage device readable by a machine, tangibly embodying a program of instructions executable by the machine to perform a method for automatically estimating the optimized cost of a part during the course of design of the part on a CAD system by a designer. The method includes extracting parametric features of a current design from the CAD system. Manufacturing cost drivers are identified on the basis of the parametric features. Using process models, the manufacturing cost drivers are translated into costs. The costs are simultaneously optimized with respect to a plurality of operations within specified machine constraints using an algorithm with dynamically linked structures to obtain estimates of optimized costs and cost reasoning. An estimate of optimized costs and cost reasoning is fed back to the designer as an output display on an output device.

In accordance with yet another embodiment of the invention, there is provided a system for automatically estimating the optimized cost of a part during the course of design of the part on a computer-aided design (CAD) system by a designer. The system includes means for extracting parametric features of a current design from the CAD system. The system further includes means for identifying manufacturing cost drivers on the basis of the parametric features; means for translating manufacturing cost drivers into costs using process models; and means for simultaneously optimizing costs with respect to a plurality of operations within specified machine constraints using an algorithm with dynamically linked structures to obtain estimates of optimized costs and cost reasoning. Feed back means are used to provide to the designer an estimate of optimized costs and cost reasoning as an output display on an output device.

In accordance with still another embodiment of the invention, there is provided a computer program product for automatically estimating the optimized cost of a part during the course of design of the part on a computer-aided design (CAD) system by a designer. The computer program product includes a computer usable medium having computer readable program code thereon. The computer readable program code includes program code for extracting parametric features of a current design from the CAD system; program code for identifying manufacturing cost drivers on the basis of the parametric features; program code for translating manufacturing cost drivers into costs using process models; program code for simultaneously optimizing costs with respect to a plurality of operations within specified machine constraints using an algorithm with dynamically linked structures to obtain estimates of optimized costs and cost reasoning; and program code for feeding back to the designer an estimate of optimized costs and cost reasoning as an output display on an output device.

In accordance with embodiments related to the above-described method, system, computer program product and program storage device, translating manufacturing cost drivers into costs may employ company specific cost data. A view of the part under design and a list of operant cost drivers may be displayed concurrently. Feeding back an estimate of costs may include displaying a current and any former estimate of costs. Optimizing costs may include minimizing machining time and/or maximizing machine life.

In further embodiments related to the above-described method, system, computer program product and program storage device, simultaneously optimizing costs may include using a genetic optimization algorithm. A plurality of strings may represent machining passes. The strings may be dynamically connected through linked structures. The strings may include at least one of a depth of cut string, a feed rate string, and a cutting speed string. Each of the depth of cut string, the feed rate string, and the cutting speed string may be divided into roughing and finishing passes. The genetic optimization algorithm may be used, for example, to minimize costs. The genetic optimization algorithm may include a crossover operator, a mutation operator, a delete operator, and/or a shuffle operator.

In still further embodiments related to the above-described method, system, computer program product and program storage device, optimizing costs may include using a double list data structure having a pointer to a previous linked list data structure and a pointer to a next linked list data structure. Optimizing costs may include using a Detached Linked Structure (DLS). A DLS node may include a field indicating a relative position of the DLS node within a hierarchy; a field indicating a type of object associated with the node; a field indicating relative position of the node in a list having the same objects; and/or a field including a pointer pointing to one of a root, head, and tail. The DLS node may also include a pointer to a previous linked list data structure and a pointer to a next linked list data structure.

BRIEF DESCRIPTION OF THE DRAWINGS

The foregoing features of the invention will be more readily understood by reference to the following detailed description, taken with reference to the accompanying drawings, in which:

FIG. 4 shows the dialog box of the user interface of FIG. 3 with the cycle time window displayed, in accordance with an embodiment of the invention.

FIG. 5 shows the dialog box of the user interface of FIG. 3 with the cost detail window displayed, in accordance with an embodiment of the invention.

FIG. 9 shows a stock material list, in accordance with an embodiment of the invention.

FIG. 13 shows the user interface dialog box for Batch Mode, in accordance with an embodiment of the invention.

FIG. 22 illustrates a double linked list of extracted manufacturing features, in accordance with an embodiment of the invention.

DETAILED DESCRIPTION OF SPECIFIC EMBODIMENTS

Figure 1:
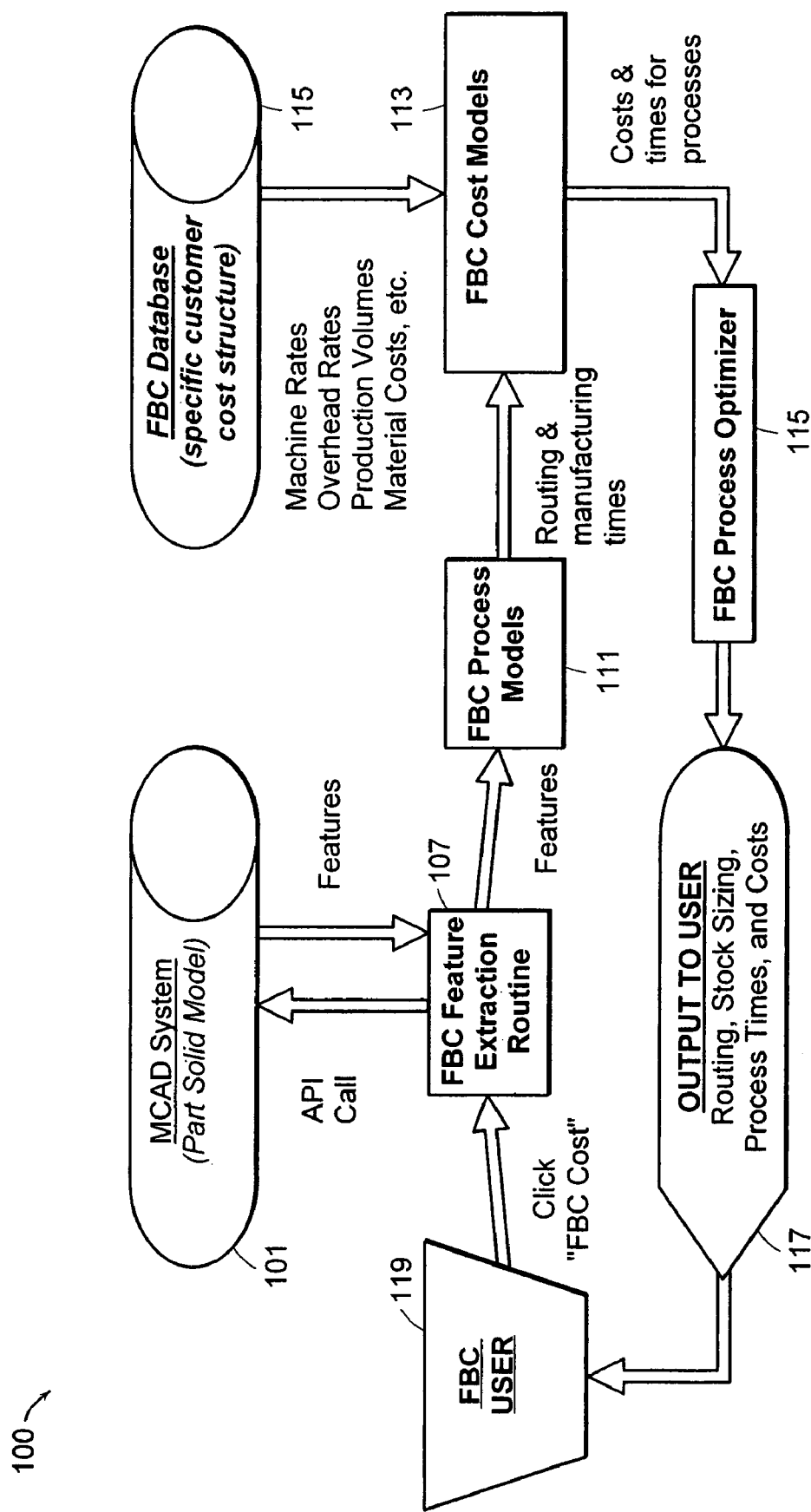
FIG. 1 is an overview schematic of an integrated real-time feature based cost (FBC) estimating system, in accordance with an embodiment of the invention.

The present invention is directed towards an integrated real-time feature based cost (FBC) estimating system that is in direct communication with a CAD system. FIG. 1 shows an overview schematic of an FBC system 100, in accordance with a preferred embodiment of the invention. The FBC user designs a part or assembly of parts using the CAD system 101 and initiates a cost estimate by clicking, for example, on a "FBCost" button. This action initiates an application interface (API) call and geometry entities defined typically by vector definitions of vertices, lines, and/or curved surfaces in space are analyzed for the presence of a range of key features 105. The FBC Feature Extraction Routines 107 mathematically manipulate the features to determine the presence and number of feature cost drivers. These cost drivers are then passed onto the process models 111 which are mathematical equations used to calculate machine cycle times and operator times for performing miscellaneous tasks such as loading and unloading processing machines. These times are converted to cost by the FBC Cost Models 113. These are further equations that convert times to costs using company specific data that may be transferred to the FBC Cost Models 113 from an FBC database 115. Company specific data may include, without limitation, labor rates, machine depreciation rates, and overhead rates.

The FBC Process Optimizer 115 is then activated to find the sequence of processes that offers the lowest cost solution, which is then output 117 back to the user. In some cases, all possible routings may be sequentially analyzed to determine the lowest cost. In other cases where large combinatorial effects would result in excessive computation times, genetic algorithms are used to find a near optimum solution. The response speed here is key to the functionality of the real-time use of FBC. Once the optimum process routing has been determined and the results of the analysis are returned to the user the design cycle may be repeated, following either design change or iteration.

Figure 2:
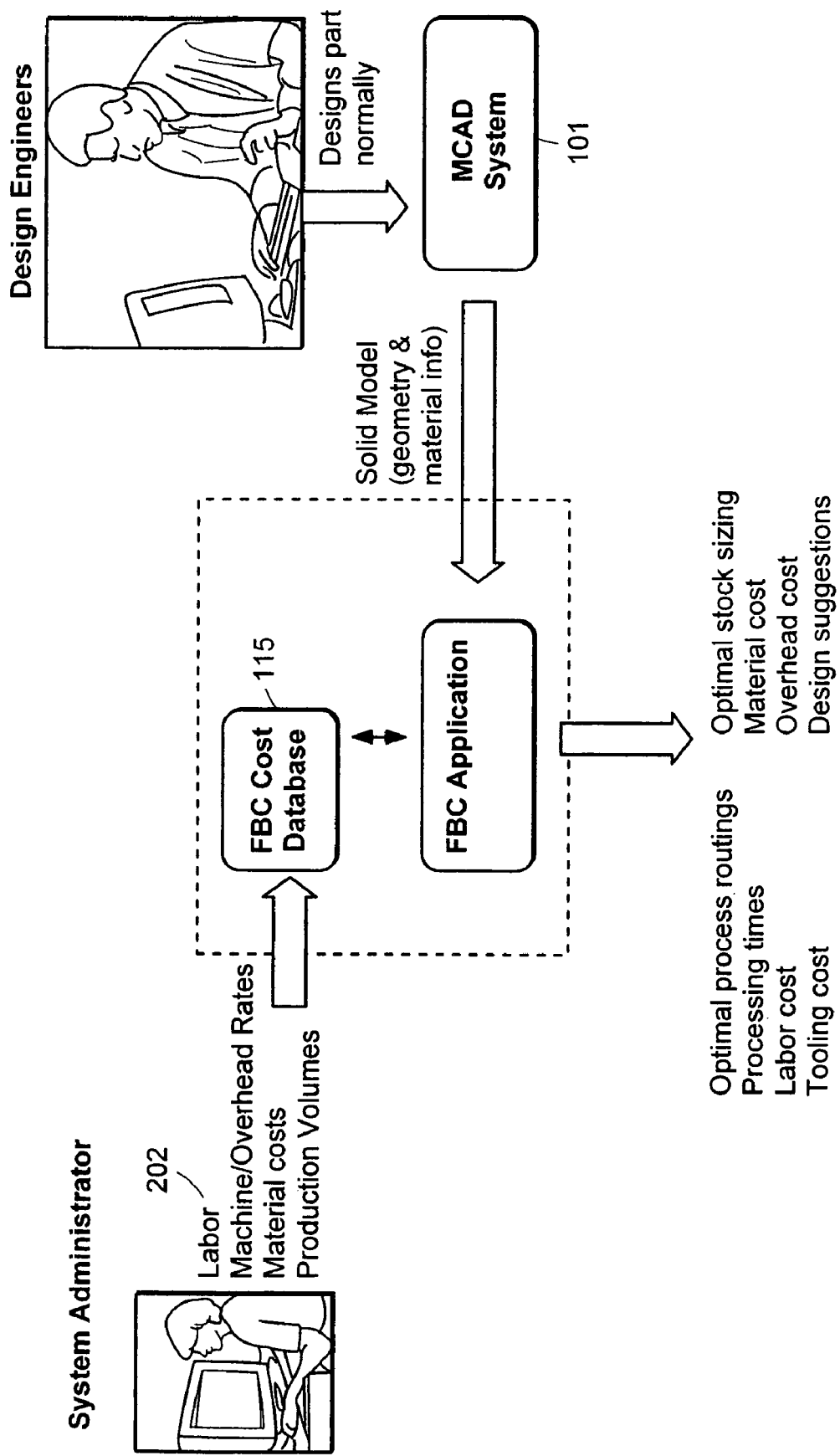
FIG. 2 is a schematic showing interaction of an FBC estimating system with a corporate IT Infrastructure, in accordance with an embodiment of the invention.

Unlike other commercial cost estimating systems that rely on industry averages, the preferred embodiment of the invention utilizes company specific data stored, typically in the FBC database 115. The improved accuracy of the present invention relies on the timely updating of this company specific data. FIG. 2 shows the infrastructure that provides this capability. A system administrator interface 202 is used to update the FBC database 115.

Figure 3:
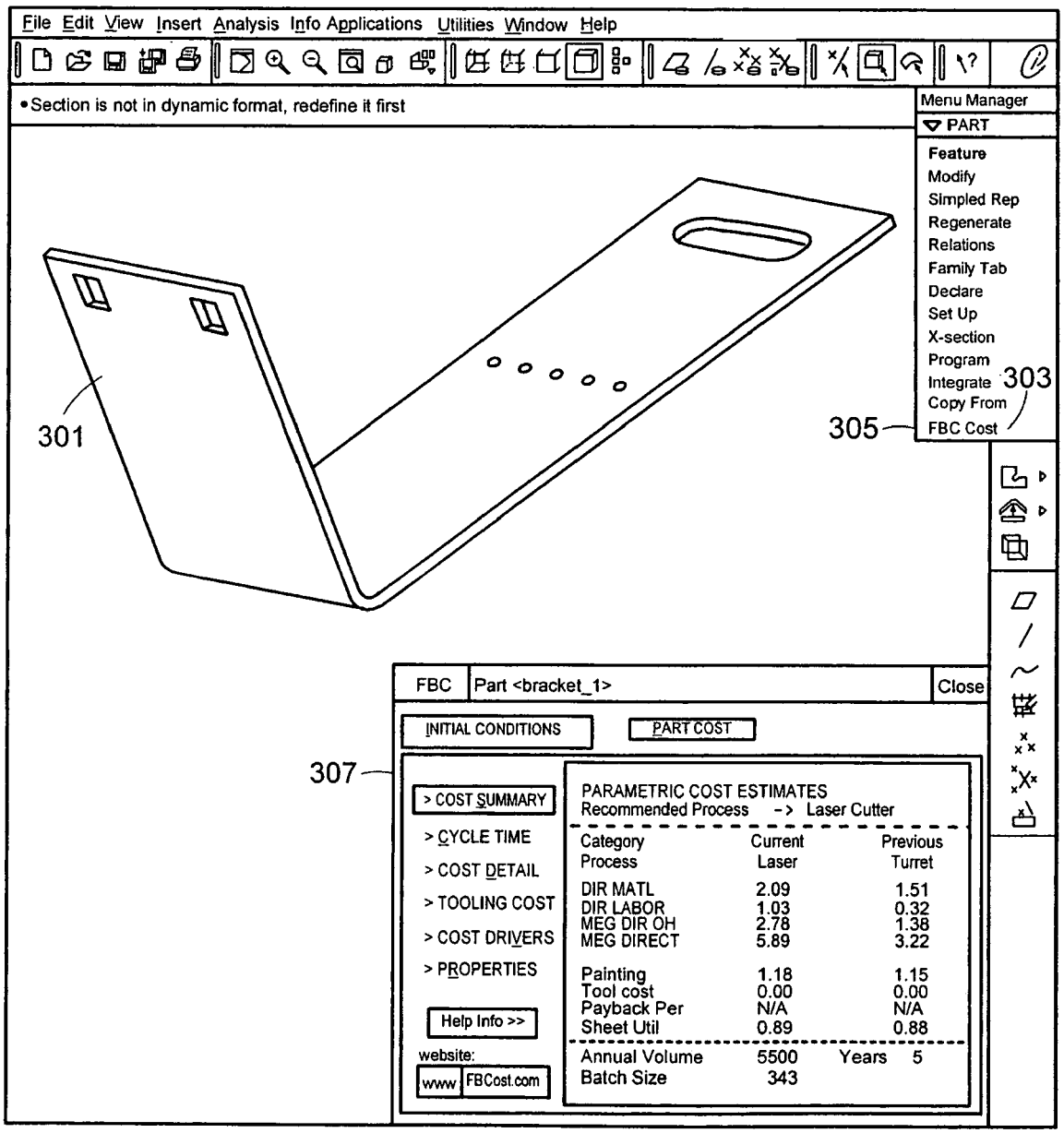
FIG. 3 shows a CAD system screen display that includes a pop-up dialog box that serves as a user interface, with a cost summary window displayed, in accordance with an embodiment of the invention.

Various screen displays that may be embodied in the FBC estimation system 100 are now described, in accordance with various embodiments of the invention. FIG. 3 shows a small sheet metal bracket 301 being designed using a CAD system (Parametric Technology's ProEngineer v2001) with an embodiment of the present invention installed and fully integrated. At any time during the design of a part the manufacturing cost may be calculated and displayed by clicking on "FBC Cost" 303 in the Menu Manager dialog box 305. The FBC dialog box 307 appears and the cost is automatically calculated and presented to the user within a second or two. Once initiated, the window remains open and is automatically updated each time a change to the model is made and a regeneration occurs.

The FBC dialog box 307 in FIG. 3 shows the new or current cost in $s per part and identifies the recommended process routing. As shown in this example, the material cost is $2.09, the direct labor is $1.03, the direct overhead is $2.78 and the total cost, or manufacturing direct, is $5.89. The recommended process is identified as "Laser Cutter". This is actually an abbreviation for a complete routing which is shown in more detail in the Cycle Time and Cost Detail dialog boxes of FIGS. 4 and 5. FIG. 3 also shows the "Previous" cost of material, labor, overhead etc. This is the cost previous to the last regeneration or change to the part. In this example the thickness of the part had been changed from 4 mm thick to 6 mm thick. At 4 mm thick the FBC software had recommended a turret press based process routing. As can be seen, the increased thickness to 6 mm resulted not only in a material cost increase from $1.51 to $2.09 but also a significant labor cost increase from $0.32 to $1.03. The total increase in cost from $3.22 to $5.89 is unexpectedly high, almost double. Turret presses are higher speed blanking machines than laser cutters but only suitable for thinner gauge materials.

Each time the model is regenerated, the analysis is automatically repeated. FBC software extracts cost drivers, applies mechanistic process models, computes all possible process routings, and rapidly presents new costs to the user. The user may select the lowest cost option to be displayed or may select a specific process routing.

Other information is available through tabs and buttons on the FBC dialog box. FIGS. 4–8 show each of the windows selectable from the tabs in the left hand column of the dialog box, in accordance with various embodiments of the invention. The first, after the default Cost Summary described above in FIG. 3, is Cycle Time window 401, shown in FIG. 4. This window 401 shows times in minutes for each machine in the process routing for the current and previous regeneration. Cycle Time is the time in minutes that the machine takes to complete one part. Incentive Time is the operator labor time allowance in minutes. Incentive time takes into account tending/operating the machine while cycling, loading and unloading machine, and other miscellaneous activities required of the operator, such as cleaning, deburring, stacking parts etc.

The Cost Detail window 501, FIG. 5 displays the cost in dollars per part for each machine in the process routing. These costs are calculated from the cycle time and machine time information. Material cost is calculated by determining the total number of parts that may be nested on a standard sheet of stock material. FBC software optimizes this to achieve high sheet utilization and lowest material cost. Direct Labor is the operator cost for each machine or process. It is calculated by multiplying the Incentive time by the labor rate which is dependant on the labor grade for specific machines. Cost to paint the part is also provided in this window 501.

Figure 6:
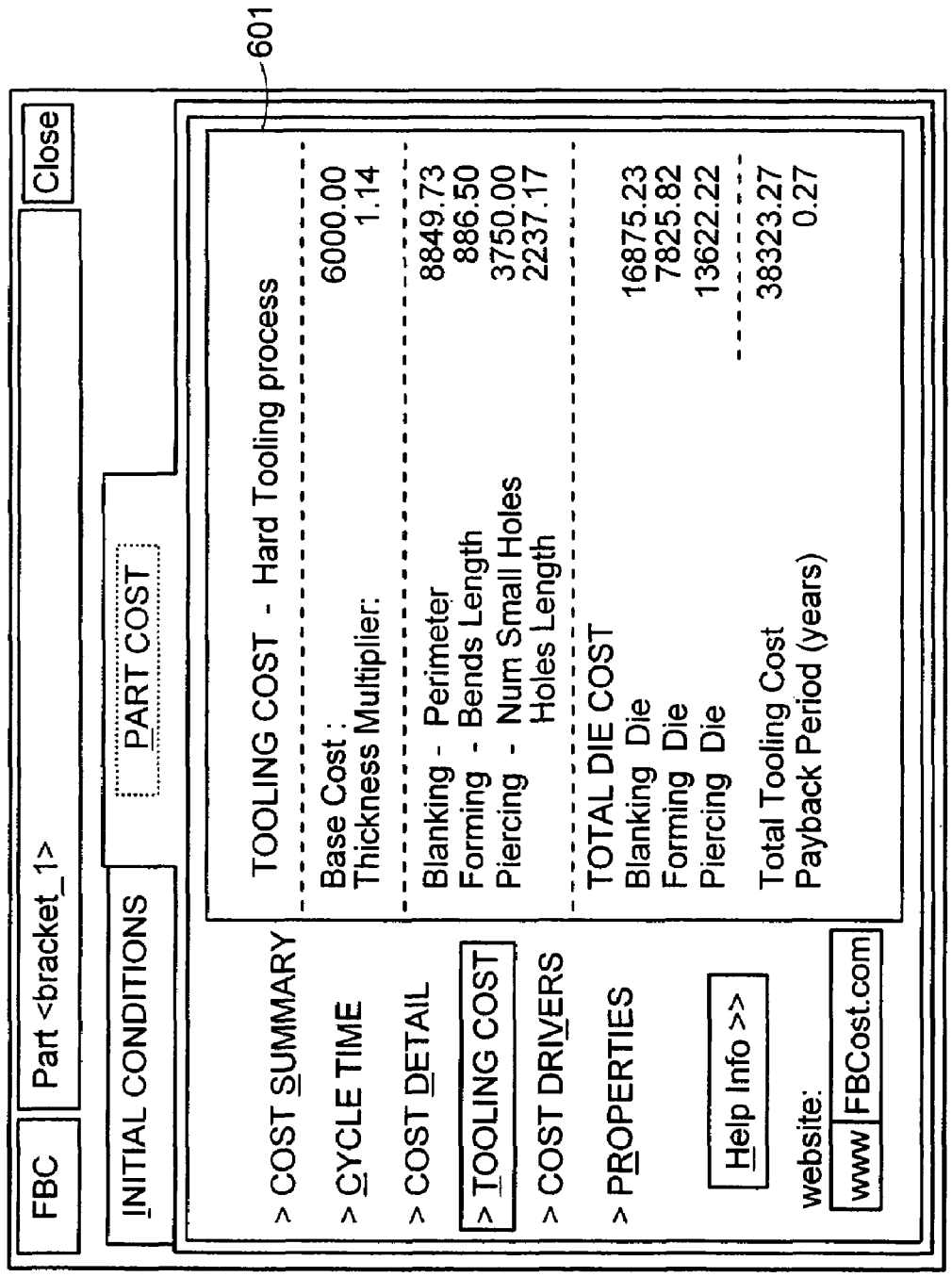
FIG. 6 shows the dialog box of the user interface of FIG. 3 with the tooling cost window displayed, in accordance with an embodiment of the invention.

The Tooling Cost window 601 shown in FIG. 6 displays the cost of tooling. This is the up-front investment in special purpose tooling. For example, if the part is to be manufactured using stamping dies, the tooling cost will present the cost of the die set. The screen capture of FIG. 6 shows the cost of each die required to manufacture the bracket part: the blanking die to cut the outer shape from the sheet would cost $16,875, the forming die required to create the bend would cost $7,825 and the piercing die to cut the internal slot and hole features would cost $13,622 with a total tooling investment of $38,323. This total is also presented in the default Cost Summary window.

Figure 7:
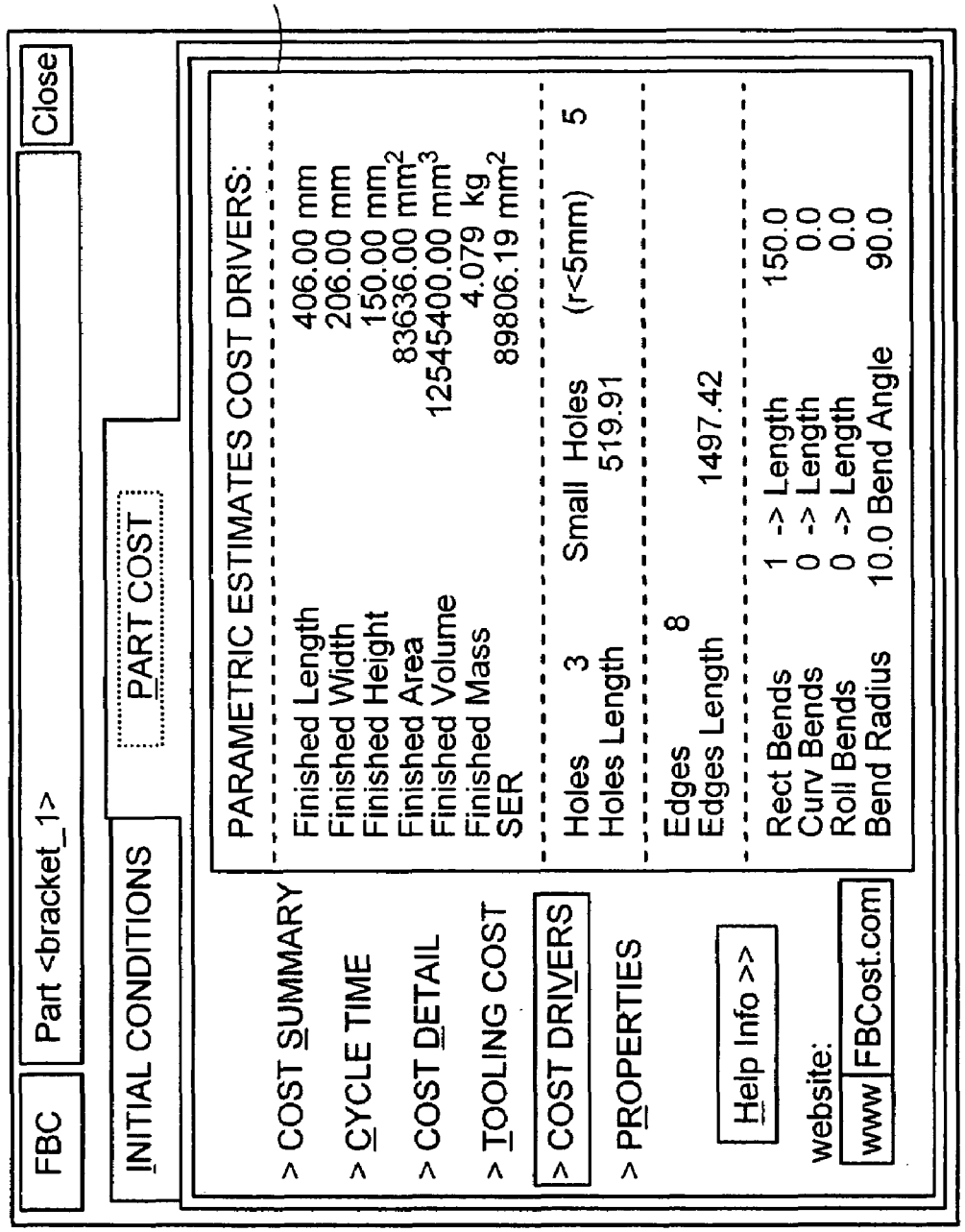
FIG. 7 shows the dialog box of the user interface of FIG. 3 with the cost drivers window displayed, in accordance with an embodiment of the invention.

The Cost Drivers window 701, shown in FIG. 7, displays the manufacturing features extracted by the FBC feature extraction algorithms. These features 'drive' the cost and are used by the process cost model equations to calculate the cycle times and the incentive times. In some cases the number of features is the cost driver (such as number of holes, edges, and different types of bends etc) and in other cases measurable parameters of the feature may be a cost driver (such as perimeter length, part volume, surface area etc). In illustrative embodiments, a novel attribute is that the feature extraction algorithms distinguish true manufacturing features. These include features that directly effect cycle time and cost computation. For example: 1. "Small Holes" are holes less than 5 mm in diameter, the size below which the laser needs to make a step change in cut speed; or 2. Collinear "bends" that can be completed by one action of the bend brake are identified through the extraction algorithm.

Figure 8:
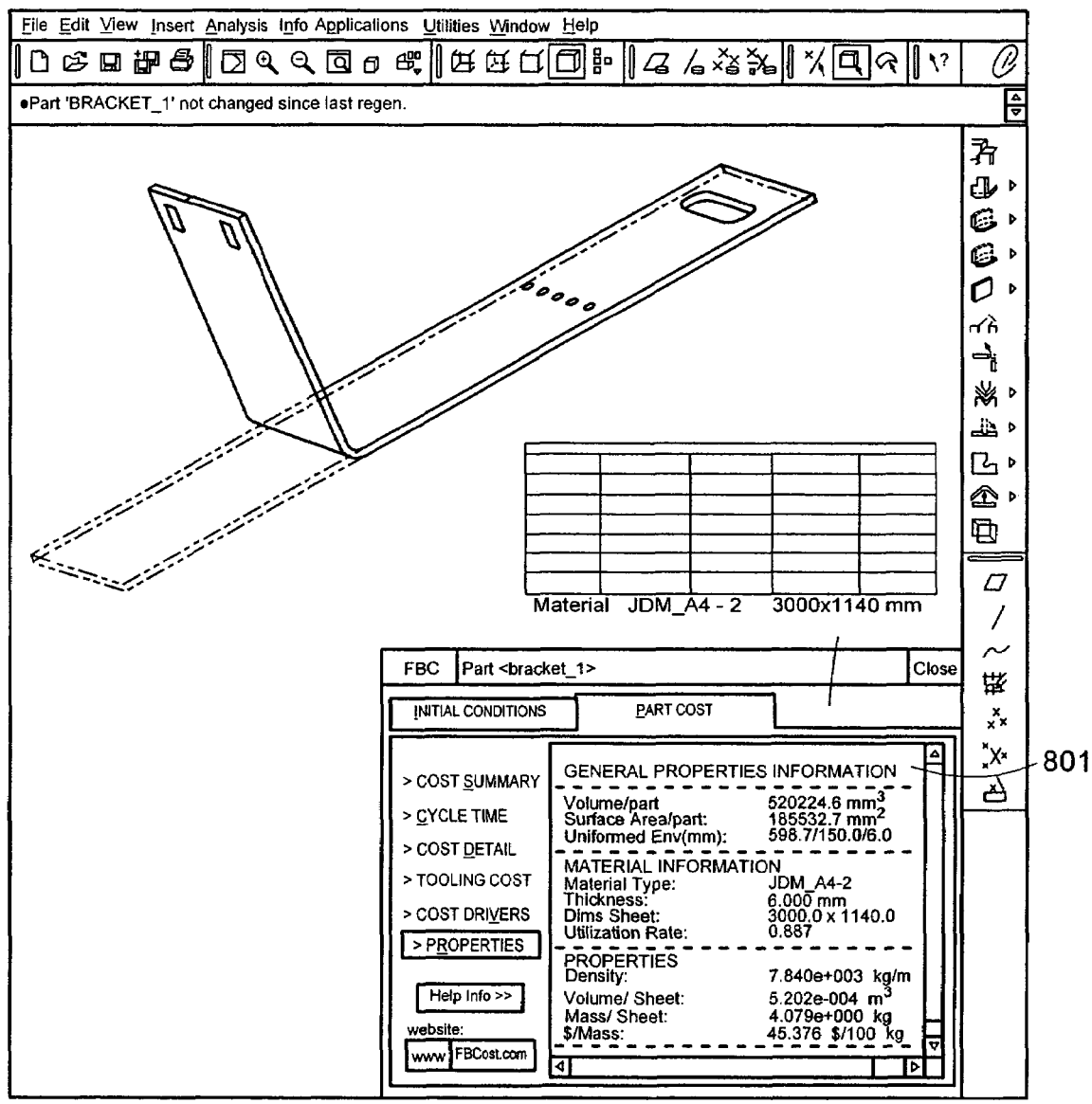
FIG. 8 shows the dialog box of the user interface of FIG. 3 with the Properties window displayed, in accordance with an embodiment of the invention.

The Properties window 801 in FIG. 8 provides property information that is primarily used to calculate the cost of raw material and any secondary operations, such as painting. Selecting the properties window in sheet metal mode superimposes the flat or blank form onto the part and shows how the parts will nest on the sheet. The percentage utilization is displayed in the window and is available to, the designer for maximizing the number of parts per sheet. A key feature of the properties window is that automatic selection of material stock is permitted to achieve the lowest cost per part. The company's stock raw material specifications, standard sheet sizes and cost per mass may be viewed by the user and used to help improve design decisions to give economic design solutions. FIG. 9 shows a stock material list 901 in accordance with an embodiment of the embodiment. As can be seen the cost per kg varies considerably and is not directly proportional to thickness. It is influenced heavily by material type and purchasing volume. Large volume discounts are available from raw material suppliers in this market. Rationalization of stock type, sizes and thicknesses by the company can help to reduce costs significantly. Thus, the designer is provided with both graphical and numeric information so as to optimize material cost. With this interface the designer has at his fingertips visual and numerical information for powerful what-if analysis. Small changes to geometry can provide for more efficient use of material and have dramatic effects on manufacturing cost.

Figure 10:
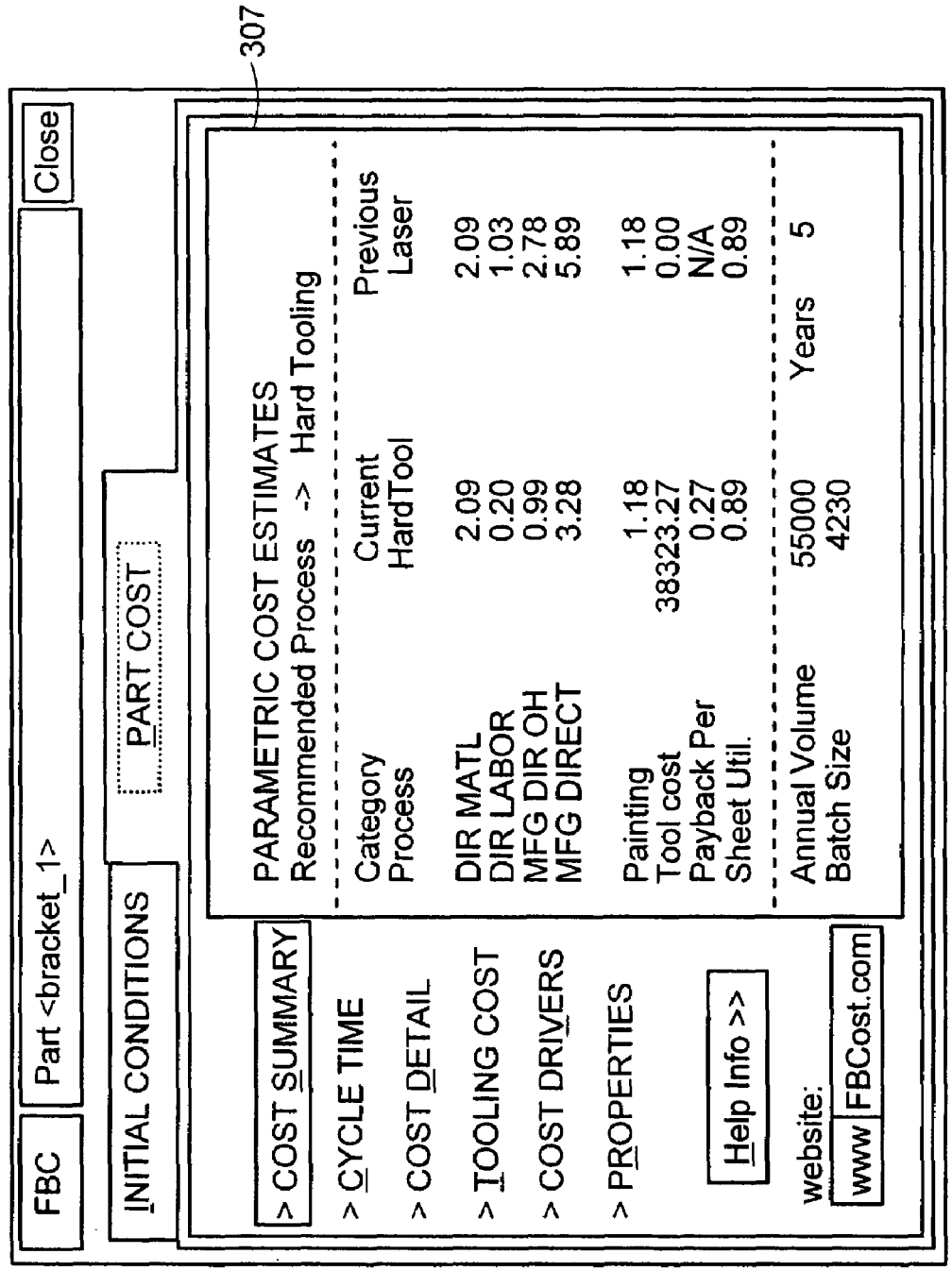
FIG. 10 shows the dialog box of the user interface of FIG. 3 with the Cost Summary window displayed following a production volume change from 5500 units to 55000 units, in accordance with an embodiment of the invention.

In accordance with various embodiments of the invention, a vehicle is provided for hard-tooling versus soft-tooling decision making, plus associated cash flow and investment risk analysis. FIG. 10 shows another view of the Cost Summary window 307 following a change to estimated production volume. The new screen capture shows the result of increasing the annual production volume from 5500 units to 55000 units over a 5 year product life. The recommended process has now changed from a soft-tooling routing incorporating a "Laser" to "Hard Tooling", a stamping die set. This decision point may be made on payback period or amortization over the predicted product life. As shown in FIG. 9 the Manufacturing Direct cost per piece has gone from $5.89 to $3.28 by utilizing a stamping die set. The die set investment is $38,323 but pays for itself in 0.27 of a year (approx. 3 months) at these volumes. Depending on the likelihood of meeting market forecasts and other factors such as the company's cash flow situation, the decision to hard tool may be overridden. In the preferred embodiment of the invention a payback period of less than 2 years will result in a recommendation to use hard-tooling.

The designer using the above-described FBC estimation system interactively learns how the design decisions he makes affects cost. The designer may explore different processes and materials and perform a number of what-if analyses. Many simple design decisions, such as material thickness and type, will be primarily driven by functionality, however, there are always many alternative fully functional design approaches that may or may not have a large impact on cost. Achieving 'maximum strength with minimum material' is a common design philosophy today but usually because material volume is relatively easy to measure. In many cases, however, a minimum material condition does not provide the most economic design. The FBC estimation system provides a tool to allow 'maximum strength for minimum cost' optimization which is usually a more direct approach to ultimately achieving the desired product design result.

Figure 11:
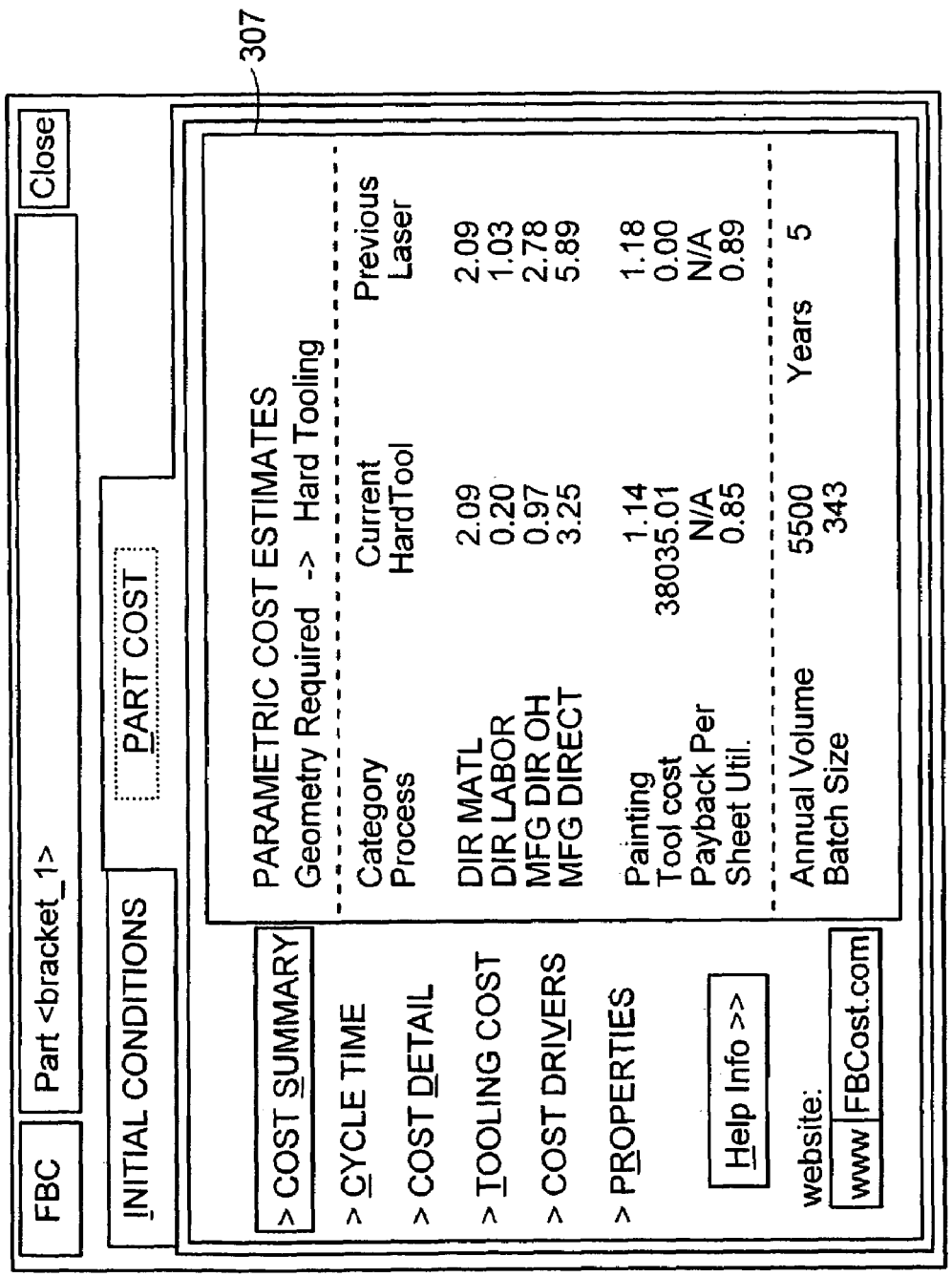
FIG. 11 shows the dialog box of the user interface of FIG. 3 with the Cost Summary window displayed following a change in geometry that resulted in a limitation in processing methods or "geometry required" condition, in accordance with an embodiment of the invention.

Also, another functionality provided by various embodiments of the invention is that it warns the user of geometry that may be forcing a higher cost processing approach. For example, FIG. 11 shows the result of increasing the bend radius of the bracket from 10 mm to 60 mm. A soft tool process such as a bend brake is no longer able to create this feature. As shown in the dialog box, hard tooling is now "geometry required"; the designer must decide whether the need for hard tooling can be justified. In some cases the designer will be unaware of the effects of such design detail, in others the designer may wish to explore the effect on cost before making the final decision.

Figure 12:
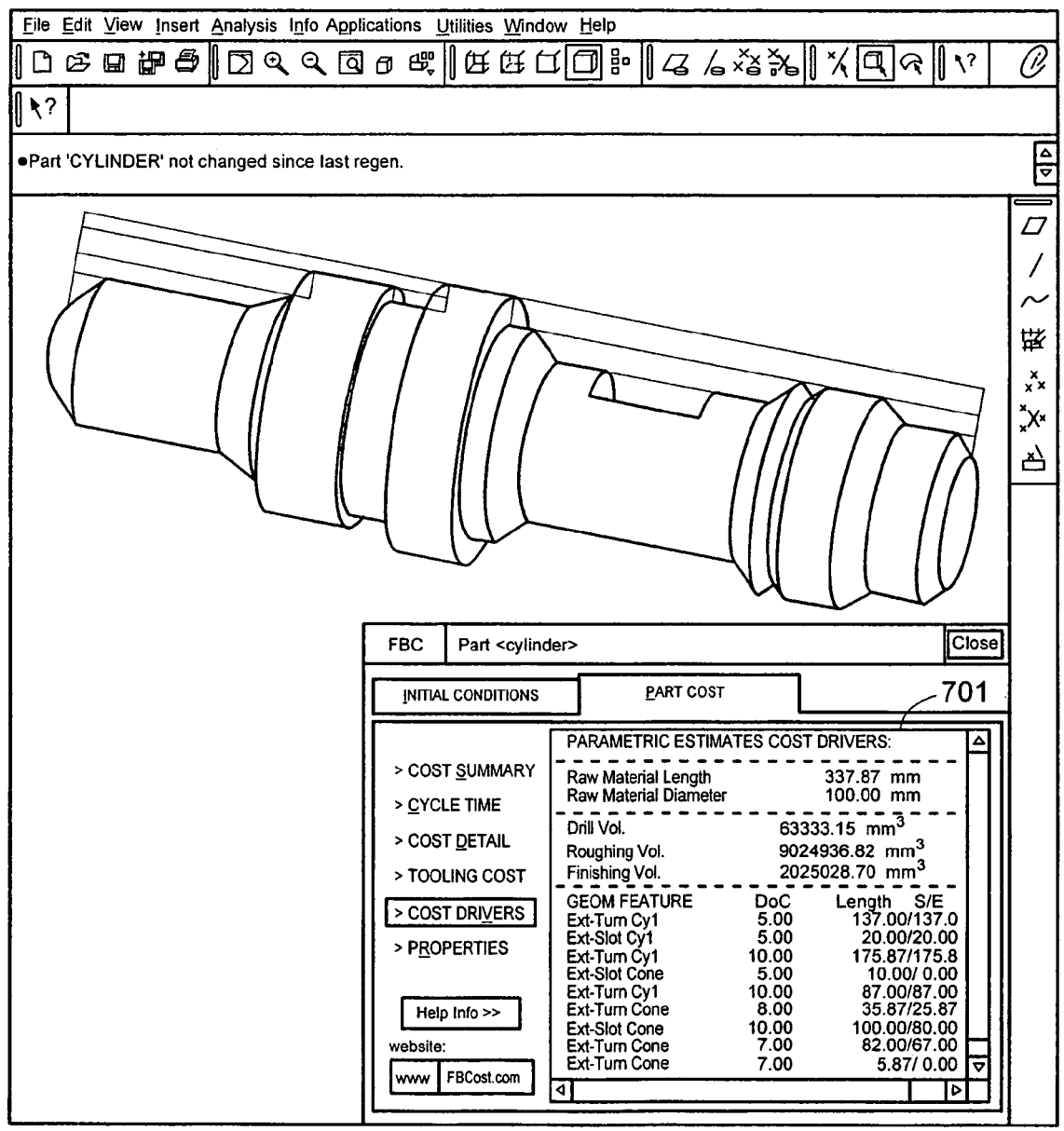
FIG. 12 shows the tool paths graphically superimposed onto the part model, in accordance with an embodiment of the invention.

With many manufacturing methods such as machining, where multiple material removal approaches are possible, the designer may wish to view the cost drivers selected by the cost optimization algorithm. In accordance with an embodiment of the invention, the tool path cost drivers 701 are graphically superimposed on the model, as shown in FIG. 12. Simultaneously the processing parameters such as speeds, feed, and depths of cut are numerically displayed in the associated dialog box.

The use of the invention by a designer to interactively obtain manufacturing cost of an individual part is an important attribute of the invention, however, another feature of the invention is to automatically obtain manufacturing process cost information for multiple parts. A multiple part mode of operation called Batch Mode has been conceived and implemented in the preferred embodiment. FIG. 13 shows the user interface dialog box for Batch Mode 1301. In this dialog box, the cost estimation button invokes an automatic high-speed process to open each part, determine its lowest cost routing (if desired), and estimate manufacturing cost. The cost summary information for each part may then be exported into a spreadsheet, such as Excel, for interim design reviews, project cost roll ups etc.

Figure 14:
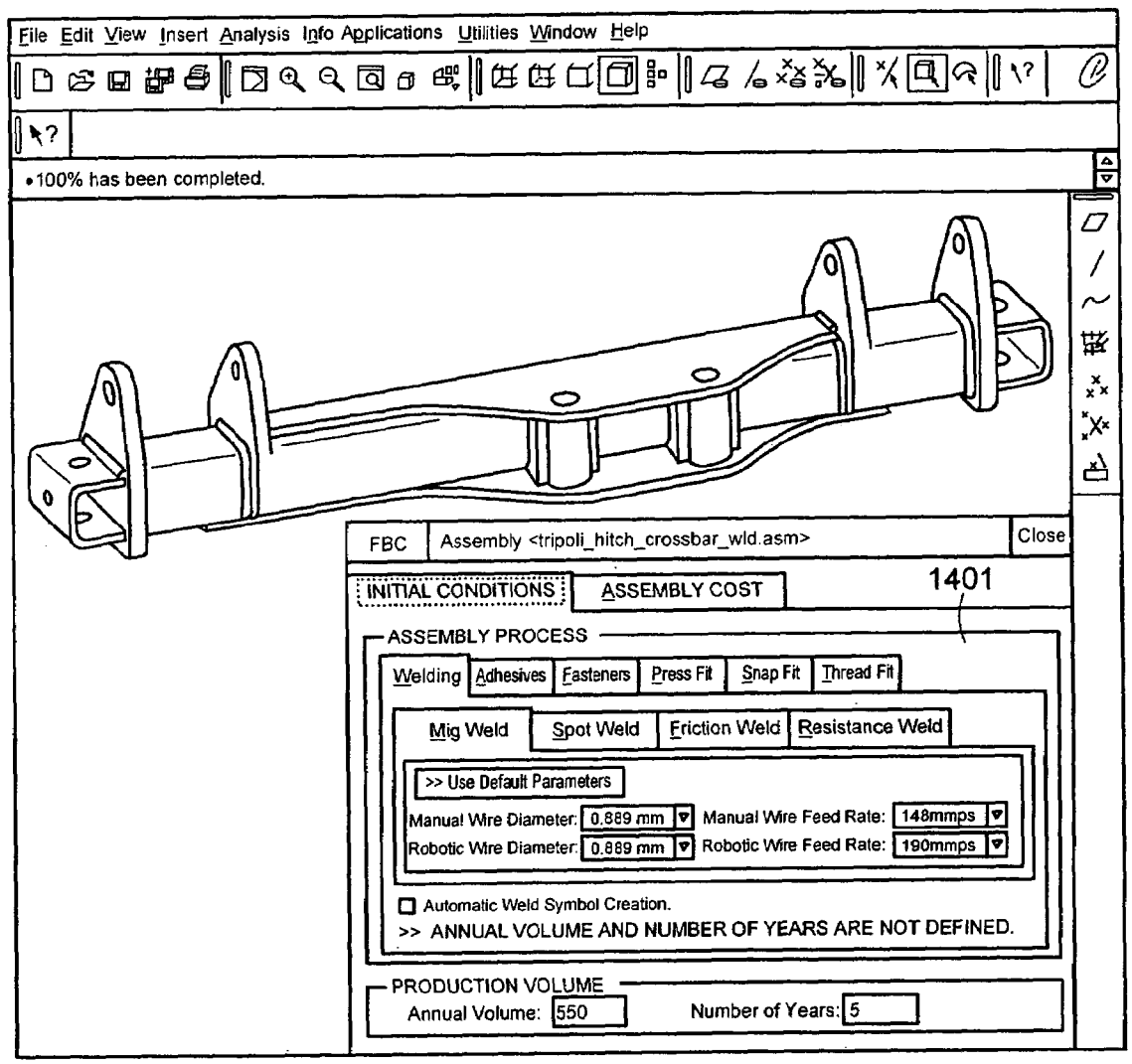
FIG. 14 shows the Initial Conditions window of the assembly mode dialog box, in accordance with an embodiment of the invention.

FIG. 14 shows another mode of operation of the preferred embodiment, assembly mode. In assembly mode, assembly process cost is computed and presented to the user. FIG. 14 shows the initial conditions window 1401 within the assembly mode. With this window 1401, the desired assembly process and assembly volume is selected from a range of possible processes. The tabs show Welding, Adhesives, Fasteners, Press Fit, etc and sub-processes for each, such as Mig welding, Spot welding, Friction welding, and Resistance welding for welding processes. Also within this window 1401, at the bottom, the production volume and number of years of predicted product life is inserted by the user.

Figure 15:
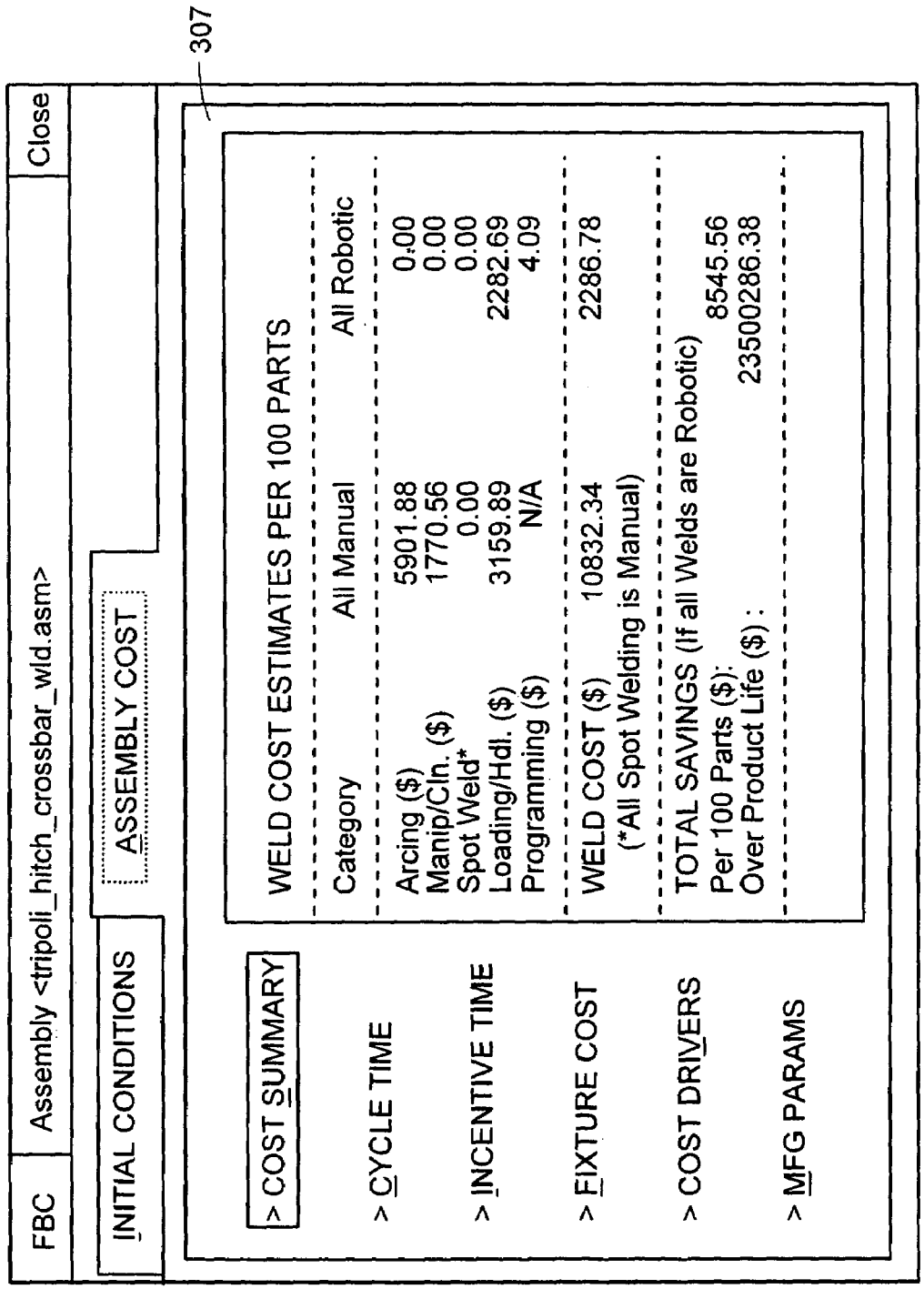
FIG. 15 shows the Cost Summary window within the assembly mode dialog box, in accordance with an embodiment of the invention.

FIG. 15 shows the Cost Summary window 307 within the assembly mode dialog box. Once again the software rapidly extracts the required feature cost drivers and presents the results of the cost analysis to the user. In the example, the CAD system has been used to assemble a number of parts and then add the required welds. The assembly cost window of the preferred embodiment shows the costs for both manual and robotic MIG welding. More details regarding specific cost drivers and useful outputs, such as welding wire consumption, are shown by clicking on the other tabs shown on the left hand side of the dialog box.

With many manufacturing methods, such as machining, a very large number of alternatives exist for processing and determining the lowest cost approach. A large number of variables include types of cutting tools, associated cutting speeds, cutting feeds, depths of cut, and order of completing geometric surfaces. Also, the real time integrated FBC concept needs to interrogate a large number of different process routings across many different process subgroups to return the lowest cost routing to the user within a short timeframe, a few seconds at most.

Figure 16:
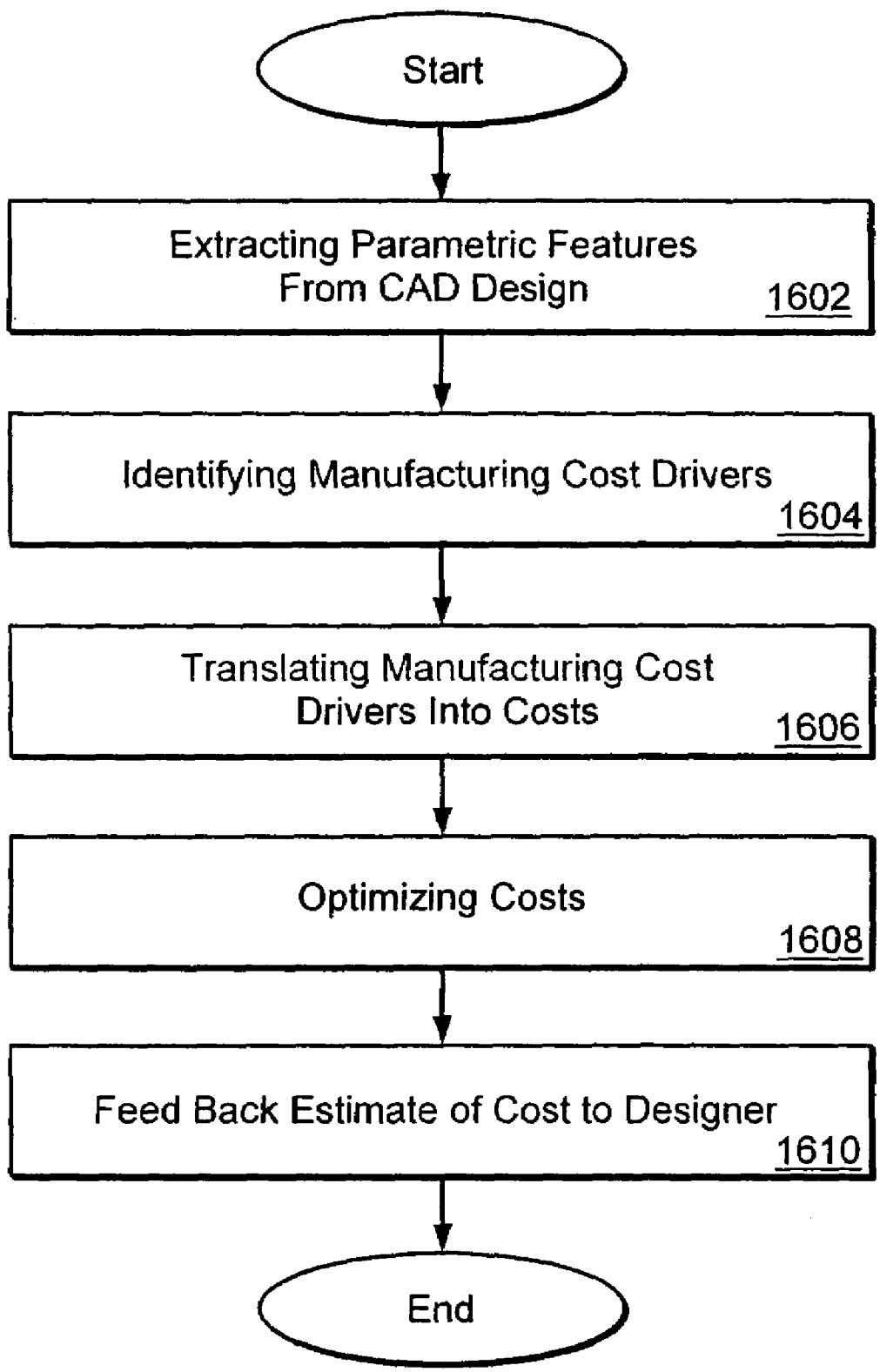
FIG. 16 is a flowchart for a method of estimating optimized cost, in accordance with one embodiment of the invention.

FIG. 16 is a flowchart for a method of automatically estimating the optimized cost of a part during the course of design of the part on a computer-aided design (CAD) system by a designer, in accordance with an embodiment of the invention. The method begins by extracting parametric features of a current design from the CAD system, step 1602. Manufacturing cost drivers are identified, step 1604, on the basis of the parametric features. The manufacturing cost drivers may be specific to a task or set of tasks associated with the manufacturing sequence. Using process models, the manufacturing cost drivers are translated into costs, step 1606, using methodology described, for example, in Hiller, E. A., "Parametric Cost Modeling: An application to Sheet Metal", MS Thesis, 1997, and Marini, M. V., "Parametric Modeling for Early Cost Estimation of Sheet Metal Parts", M.S. Thesis, 1999, which are both incorporated herein by reference in their entirety.

Examples of cost drivers are the number of discrete bends in a sheet metal part or the length of welds in a welded assembly. In the case of welded assemblies, knowledge of the length of the weld may be used to determine the welding time provided the welding speed is known. Time may then be converted to cost with knowledge of the relationship between time and cost, such as labor rates and machine depreciation rates.

In the case of bends, one bend or several bends may correspond to one action of the bending machine, depending on the type of bending or forming process to be used and the orientation of the bends on the part. These geometry cost drivers must therefore be converted into manufacturing cost drivers before determining the processing time and therefore cost. Mathematical models, either mechanistic or empirical, are used to translate these cost drivers into machine cycle times, miscellaneous labor times such as loading and unloading machines, raw material costs, labor costs and total direct manufacturing costs. Other costs are also computed directly from the cost drivers. Such costs include hard tooling costs associated with the need for molds or dies and secondary finishing costs such as hardening or painting.

In step 1608, the costs are simultaneously optimized with respect to a plurality of operations within specified machine constraints using an algorithm with dynamically linked structures to obtain estimates of optimized costs and cost reasoning. Simultaneously optimizing costs with respect to a plurality of operations and machine constraints is more efficient than performing serial optimization and allows for quick response speed, which is key to the functionality of the real-time use of FBC. An estimate of optimized costs and cost reasoning is fed back, step 1610, to the designer as an output display on an output device.

Illustrative embodiments of the invention enabling high speed real time CAD integration include the methodology of flexible memory allocation and efficient memory management in combination with genetic algorithms.

In software development, abstract data types (ADT) can be defined as a set of abstract data with limited possible operations that can be performed on that data. ADT lists are the most generic of data structures used to store/retrieve information, i.e. contiguous, singly-linked, and doubly-linked lists, as described by Zych, J, "Data Structures Notes Packet #9, Lists", from CS225 Data Structure and Software Principles Class Notes, 1998–2001, University of Illinois at Urbana-Champaign, which is hereby incorporated by reference, in its entirety.

The type of structure chosen to store/retrieve a particular set of elements depends on four basic aspects: (i) the set is composed of a collection of elements that are all of the same type, for example, numbers, names, etc. . . (ii) the set is to be stored in a particular order, for example, $1^{st}$ item, $2^{nd}$ item, etc. . . (iii) the operations required, which may include, without limitation, insert, remove, and/or find, and (iv) the computational time is critical and typically evaluated through Big-O notation. Big-O notation is a generic way to calculate the level of resources an algorithm needs in the worst case implementation scenario. For example, linear algorithms are $O(n)$, and quadratic algorithms are $O(n^2)$.

A very efficient ADT list is the double linked list that is a list of structures (nodes) allocated in memory which are linked together by pointers. Each node contains pointers to the next and previous elements in the list, thus forming a bidirectional linear list. The flexible allocation—take as much as you need, but never more—of double linked lists is a primary property when the storage required is independent of the number of elements. In this case each node not only contains the element but also its properties.

Figure 17:
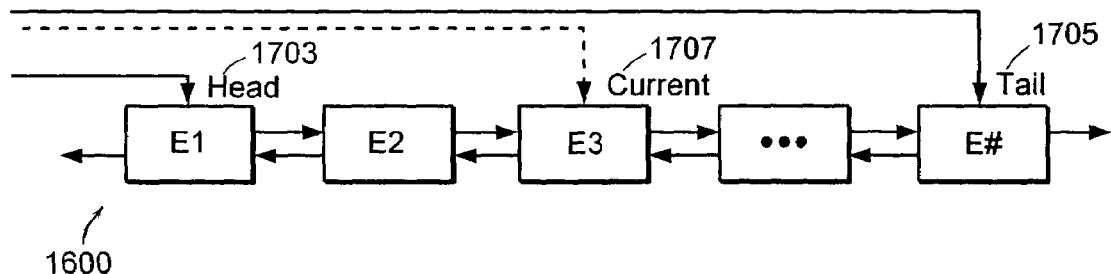
FIG. 17 illustrates a double linked list (prior art)

In a double linked list 1700, as shown in FIG. 17 (prior art), the sequence is implied by pointers (link, reference), where insertion and deletion are done by changing this pointer. For example, in deletion, the nodes must be removed by having the previous node point to the next node and the next node point to the previous node. Then you must free the memory allocated to the node you are deleting and update the pointers previously mentioned.

The problem here is that two pointers are often not enough, and extra structures are typically included to store pointers with explicit information of the list such as a head 1703, tail 1705, and current 1707, which are not part of the double linked list structure but additional elements. In practice, these "extra" elements are generally called the parents of the linked list, holding the pointers that are crucial to efficiently performing operations on data in particular positions of the list. At this point it is important to remember that nodes are simply structures that hold pointers that point to other structures or nodes.

To solve these discrepancies and to manage the list efficiently, a new process is performed by managing a fast and accurate data structure which shall be referred to as a Detached Linked Structure (DLS) that is independent of the hierarchy and the number of elements. A DLS is defined as an N-dimensional double linked list which includes nodes that operate as parent nodes and child nodes to disengage the complex structure. This structure has also the property of storing objects and their type to achieve speedier cross-reference operations without depending on the data type or class of an object.

Figure 18:
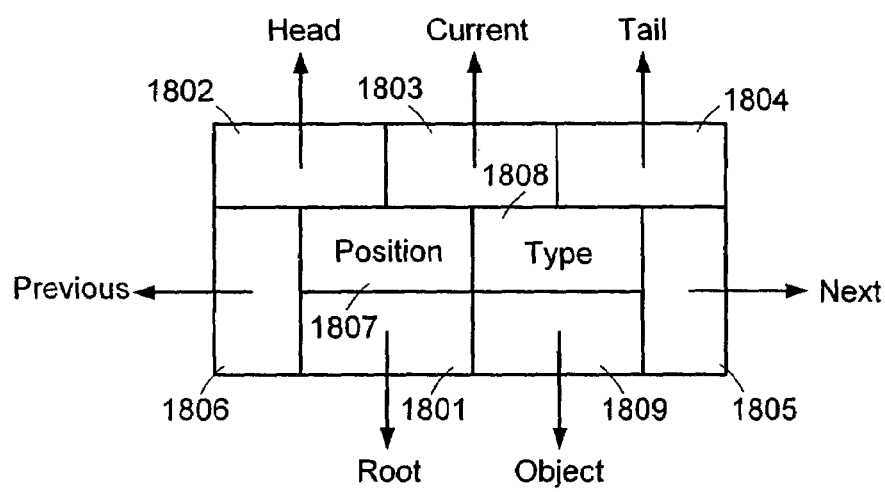
FIG. 18 illustrates a Detached Linked Stucture (DLS), in accordance with one embodiment of the invention.

A DLS is created utilizing the same double-linked concept but in a more complete structure where each node contains enough references to provide child and parent information in the same structure. In other words, a DLS provides full functionality with only one type of node that can be used to store any kind of element in an n-dimensional list. FIG. 18 illustrates a DLS node, where the fields 1801, 1802, 1803, 1804, 1805, and 1806 are pointers to other nodes: root, head, current, tail, next, and previous respectively; the root pointer aims at the element that contains the list, e.g. an edge is the root of its vertices.

The utilization of different objects such as parts, surfaces, edges etc, is an important property for developing MCAD applications. For doing this, the field 1809 works as a general pointer so that any object may be stored. Unfortunately these pointers are typeless, and to extract object specific information its type is needed. So, the field 1808 is an integer used to define the type of object of the pointer field 1809, also the field 1807 is an integer with the relative position of the node in its hierarchy level which refers to the location of the object node in the list of all objects of the same type. For example, if the object stored is a surface, properties such as surface area, normal vector, etc are applicable properties. These are not applicable to other objects, such as an edge for example (see FIGS. 20 and 21).

Figure 20:
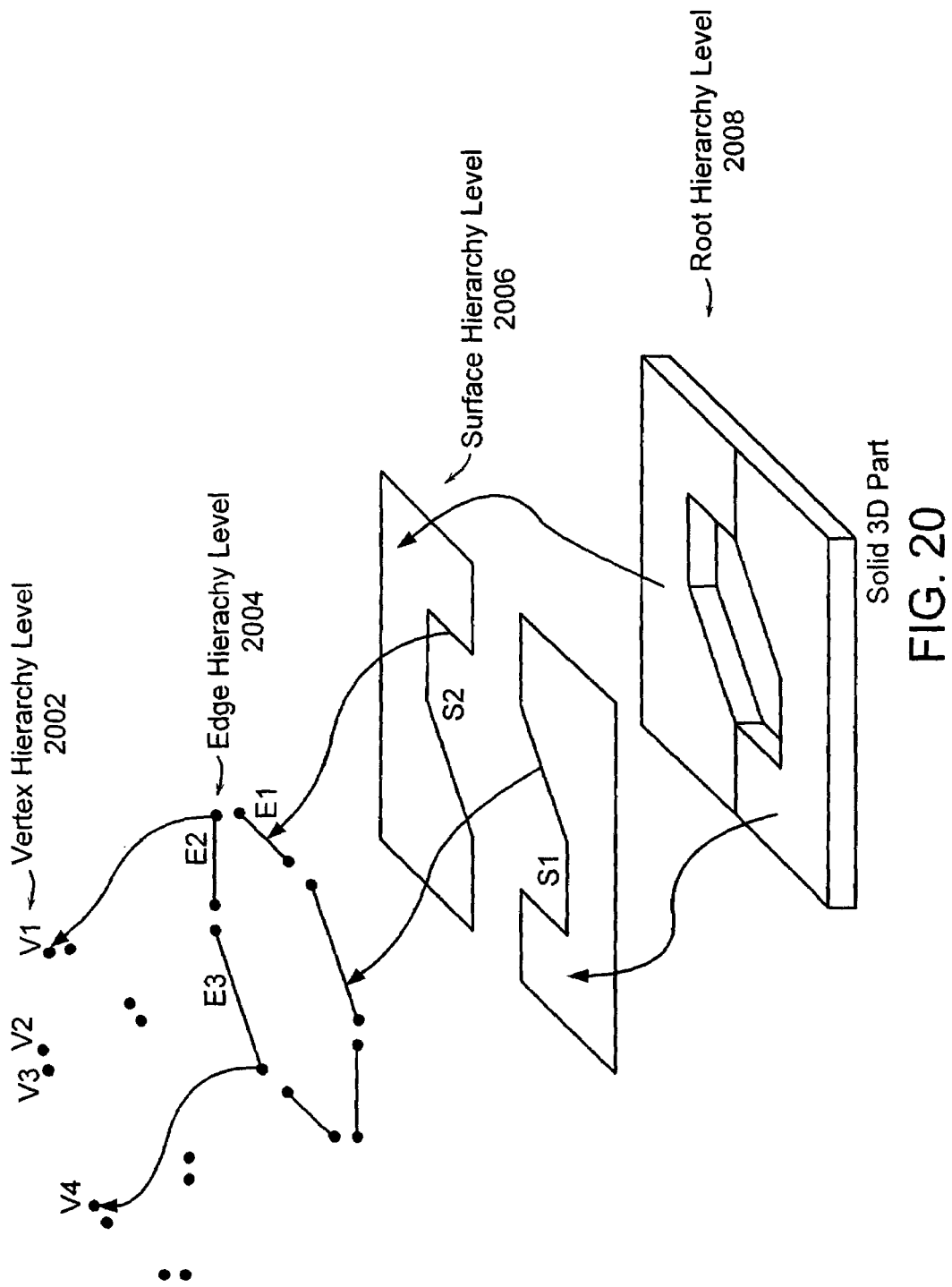
FIG. 20 is a decomposition of a 3D-Solid structure, in accordance with an embodiment of the invention.
Figures 21, 21A:
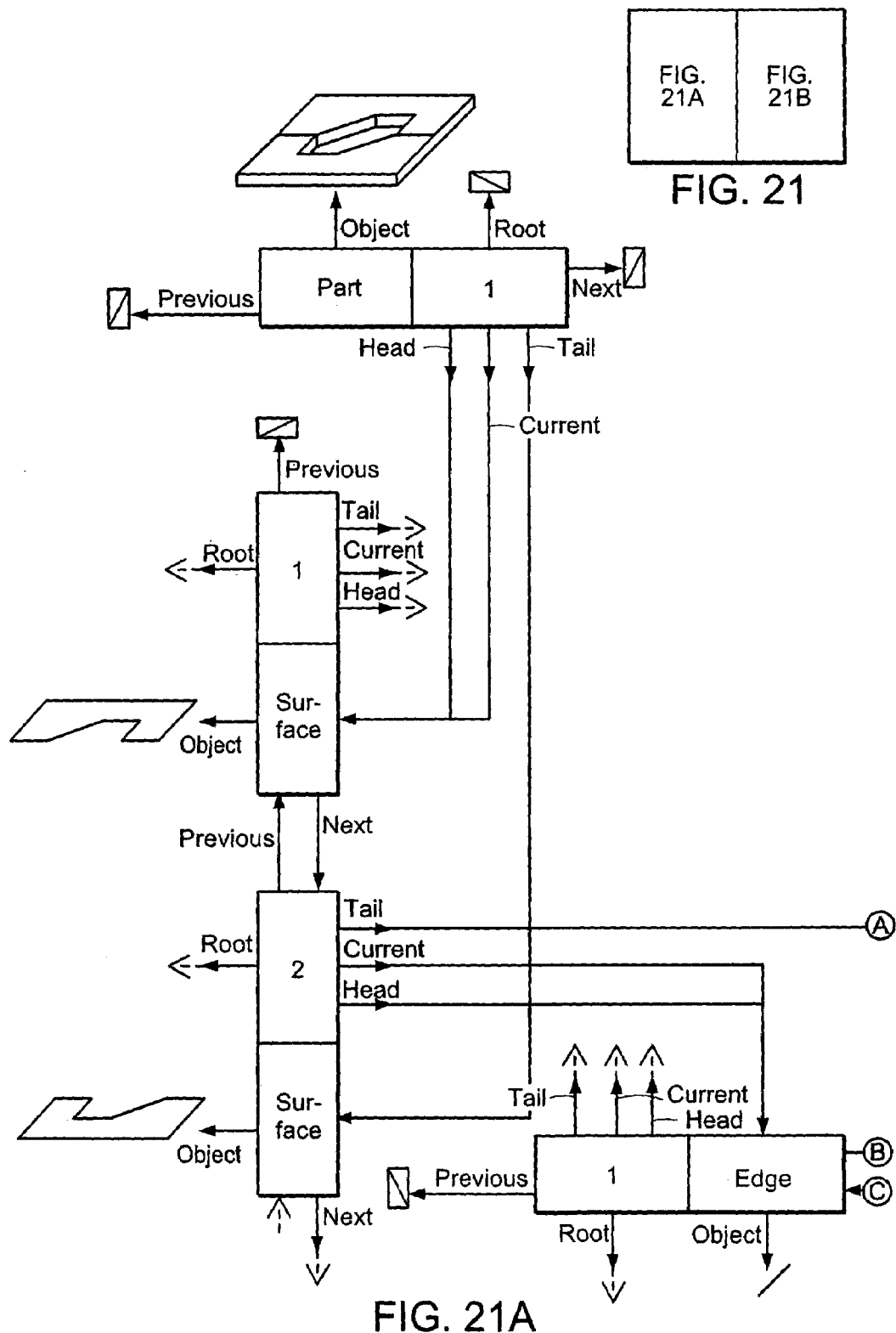
FIG. 21 is an illustration of elements formed during a geometric element extraction process using Detached Linked Structures, in accordance with an embodiment of the invention.

The main advantages of DLSs over double linked lists are:
1. Straightforward access to data due to the relative position field 1807 and the root pointer field 1801.
2. Decrease of computational time for addition and subtraction operations accessing the extreme nodes directly using fields 1802, 1803, and 1804.
3. Facilitate polymorphism through the type field 1708 providing the correct casting of the object. In programming, polymorphism refers to an ability to access any objects without depending on their data type or class. More specifically, it is the ability to redefine methods for derived classes. FIGS. 20 and 21 illustrate an explanation utilizing DLS with different objects (surfaces, edges, vertices).

Figure 19:
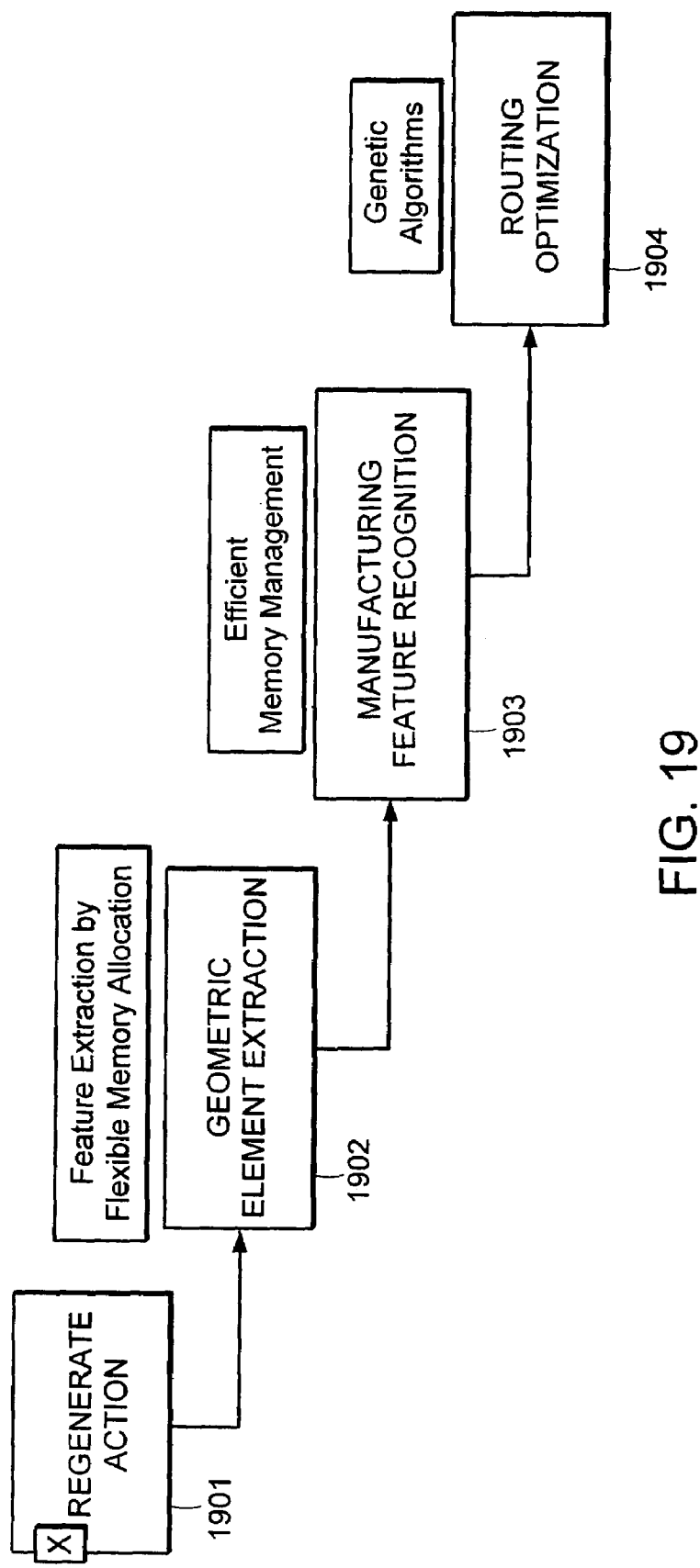
FIG. 19 is a schematic that shows a methodology that uses Detached Linked Stuctures, in accordance with an embodiment of the invention.

FIG. 19 is a schematic that shows a methodology that uses DLSs, in accordance with an embodiment of the invention. A 3D-Solid example is also provided below. The user initiates the process at step 1901, "Regenerate Action", each time he regenerates the model during the part design process. The FBC software then interrogates the geometry and extracts the primary geometric elements (vertices, edges, and surfaces), as shown in step 1902 of FIG. 19. The elements are stored via the dynamic data structure of the DLS.

Following this dynamic generation of the data structure, the geometric elements are translated into manufacturing features, step 1903 in FIG. 19, utilizing computational feature extraction algorithms as described in Schrader, R. S., "Feature Based Costing of Sheet Metal and Axisymmetric Turned Parts", M.S. Thesis, 2003 (Schrader, 2003), which is hereby incorporated by reference, in its entirety.

Finally in step 1904 of FIG. 19, potential tool paths and process routings are identified by logical comparison statements, full combinatorial analysis coupled with genetic algorithms in cases where large combinatorial situations occur. In this way, the lowest cost tool path and routing, or very close approximation to them, are returned in real time to the CAD designer.

3D-Solid Example:

This example presents and explains how the methodology of the invention optimizes the cost and manufacturing parameters of a 3D-Solid. Complex structures have several hierarchy levels with connectivity involving different types of elements. A 3D Solid is formed with a set of surfaces connected to each other through edges, and the edges through vertices, as shown in the decomposition of FIG. 20, in accordance with one embodiment of the invention. At the surface hierarchy level (S1, S2, etc), the edges (E1, E2, etc) are categorized as connectivity elements, and in the edge hierarchy level, the vertices (V1, V2, V3, V4, etc) are categorized as connectivity elements, etc.

Applying the methodology of FIG. 19 and assuming that the user already initiated the process with a regenerate action, the elements produced during the geometric element extraction process, which corresponds to the step 1902, are illustrated in FIG. 21, in accordance with an embodiment of the invention. Here, the number of primary geometrical elements is not predictable and can be very large for a complex part model. In the diagram a part is decomposed into its geometrical elements and each is stored dynamically into a DLS.

Following the example, in the root hierarchy level a DLS node with a part as the object is created and its relative information such as type, index, etc is defined. For the next (surface) hierarchy level a list of DLS nodes with surfaces as objects is created, and its relative information is defined. The next hierarchy level corresponds to edges, so a list of DLS nodes with edges as objects is created, and its relative information is defined. Finally, the hierarchy level that corresponds to vertices is created with a list of DLS nodes with vertices as objects and its relative information is defined.

After the generation of the data structure in the previous action, the manufacturing feature recognition step 1903 of the methodology of FIG. 19 is applied. At this point, all the geometric elements are translated into manufacturing features utilizing computational algorithms. For this task, as shown in the FIG. 22, a double linked list is utilized for all the extracted manufacturing features such as bends, holes, etc. Each manufacturing process has a different set of features and the methodology utilized is also different. This example is showing a Sheet Metal model.

Process planning encapsulates a particular sequence of operations, machine properties, tooling specification, and geometric information to be utilized in a given manufacturing process. Generally, cost models and routing optimization are non-linear and their optimization process is highly dependant on the complexity of the problem, and solving them utilizing conventional numerical analysis procedures will be very complicated due to the total number of combinations needed to achieve an accurate result.

Standard Genetic Algorithms (GAs) is an optimization technique that could be independent of the level of complexity, and can therefore be utilized effectively against these difficult problems finding the best combination of parameters that will minimize either production cost or time for manufacturing operations.

GAs start with an initial population of random strings known as chromosomes. In the course of reproduction, individuals are chosen form the population and genetic information is exchanged between these individuals in order to generate a subsequent population. Two parents are chosen and their chromosomes are recombined, usually utilizing an operator such as crossover.

In crossover, which is one of the most used genetic operators, chromosomes are partitioned in a position chosen randomly in order to generate two head and tail fragments that are subsequently swapped to generate two new chromosomes. The limitation of this operator is that the information contained in the two heads and in the two tails must be congruent, otherwise the constraints could be violated; this means that the length of the genetic string needs to be constant.

GAs work directly with one or more objective functions that incorporate constraints and not with secondary data such as derivatives. These objective functions, also known as fitness functions, are used to evaluate each genetic string, and by maintaining a constant population size, the selection criteria enforce the survival of the fittest notion by selecting superior individuals for subsequent generations.

In all material removal processes the main constraint is the depth of cut, and its calculation depends on different elements such as the type of tooling utilized, the machine, etc. This depth of cut is partitioned in passes where the tool removes a layer of material every time. Here, a genetic string—chromosome—constraint is the total depth of cut and is composed of n number of passes.

Figure 23:
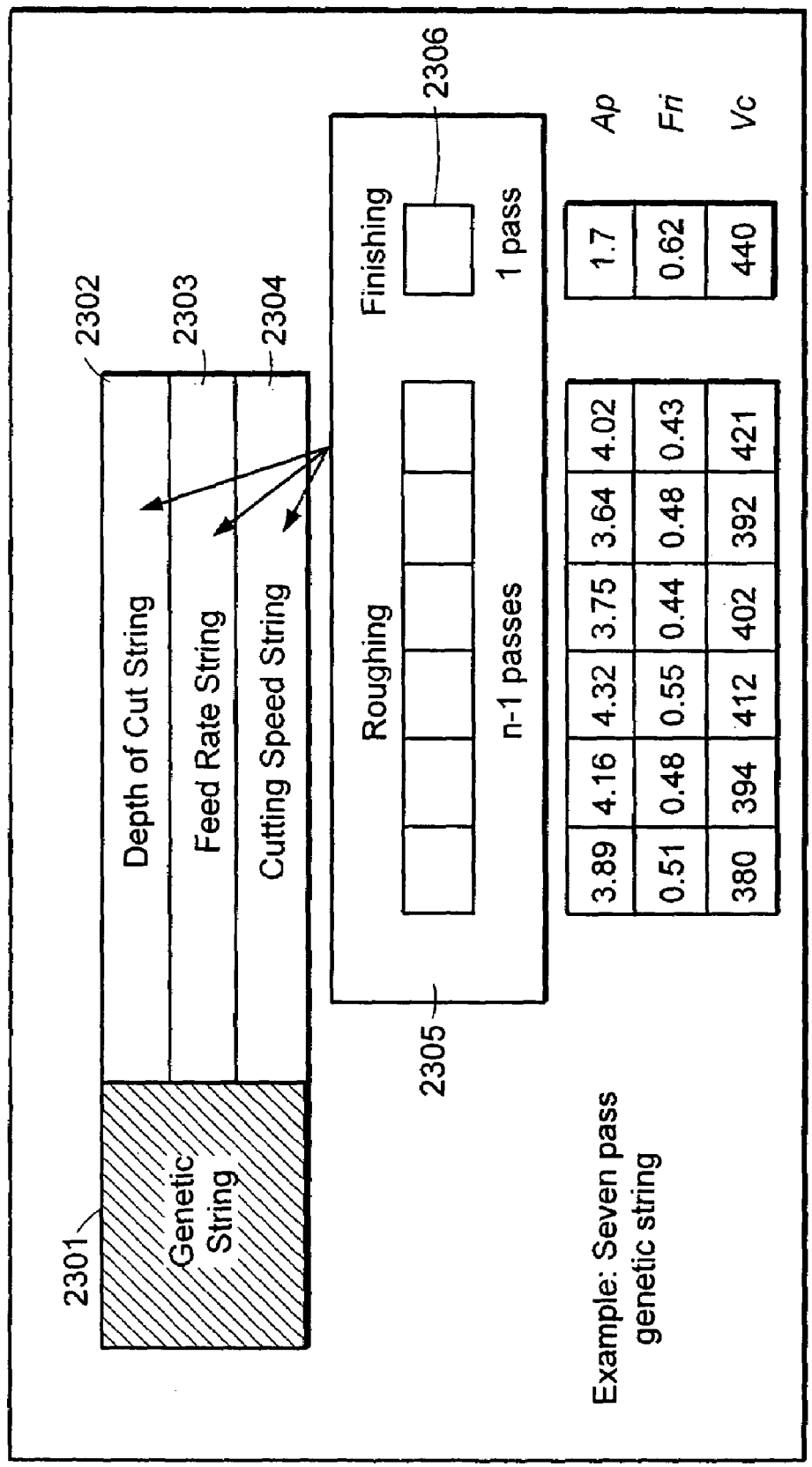
FIG. 23 illustrates a genetic sting made up of three sub-strings: a depth of cut string, a feed rate string and a cutting speed string, in accordance with an embodiment of the invention.

For this step, manufacturing feature recognition of FIG. 19, a multi-pass turning optimization problem is considered. A genetic sting 2301 is made up of three sub-strings: a depth of cut string 2302, a feed rate string 2303 and a cutting speed string 2304, as shown in FIG. 23. Each of the three sub-strings is further divided into roughing 2305 and finishing operations 2306. Since no prior assumption is made about the number of passes, a variable n is used to represent the total number of passes in the operation.

As previously mentioned, GAs start with an initial population of random strings where each string has to satisfy the constraint. The result is genetic strings of different lengths; in other words, the random generation of passes leads to variable or dynamic string lengths.

Figure 24:
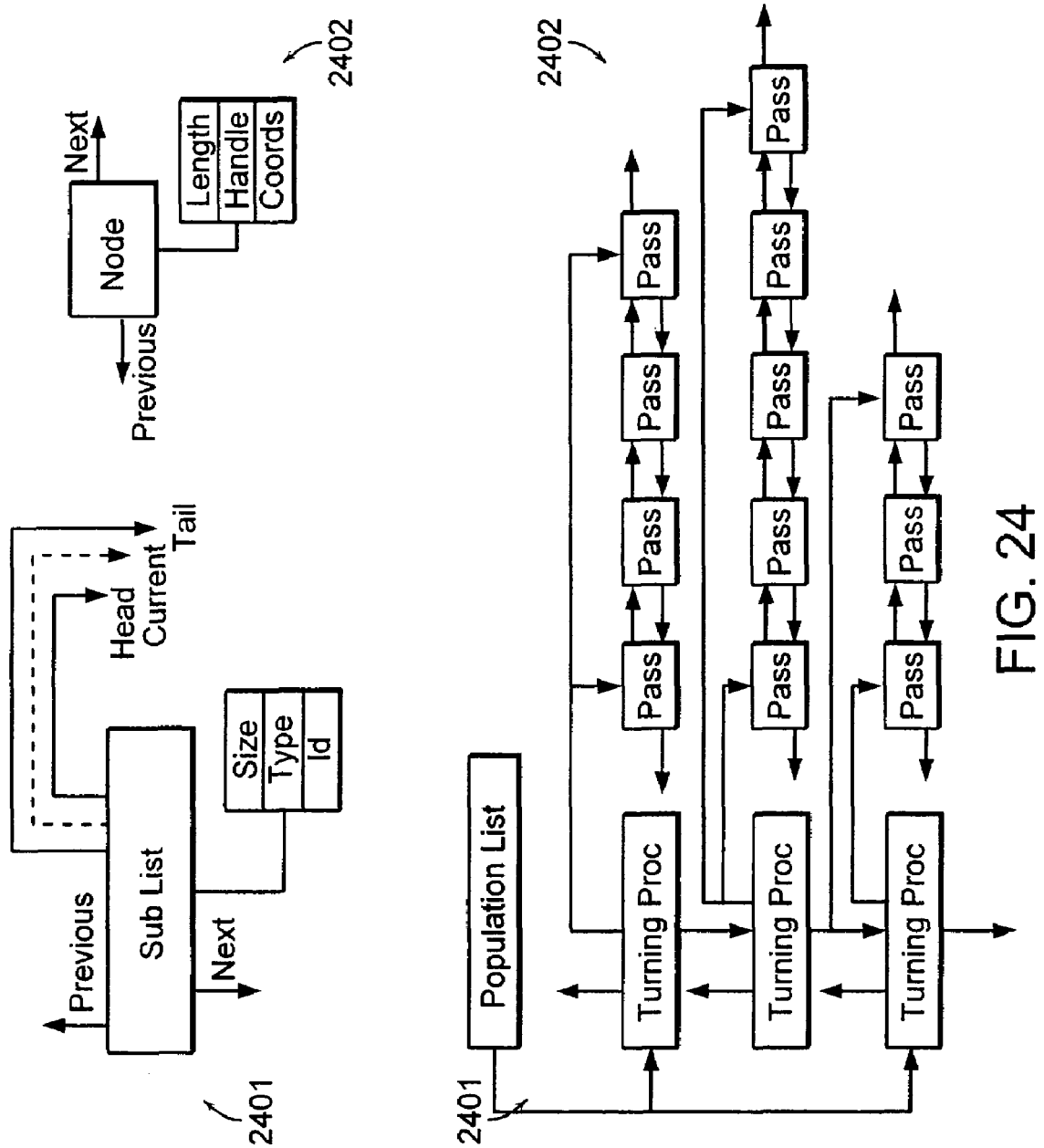
FIG. 24 illustrates a double-linked list of processes and passes, in accordance with an embodiment of the invention.
Figure 25B:
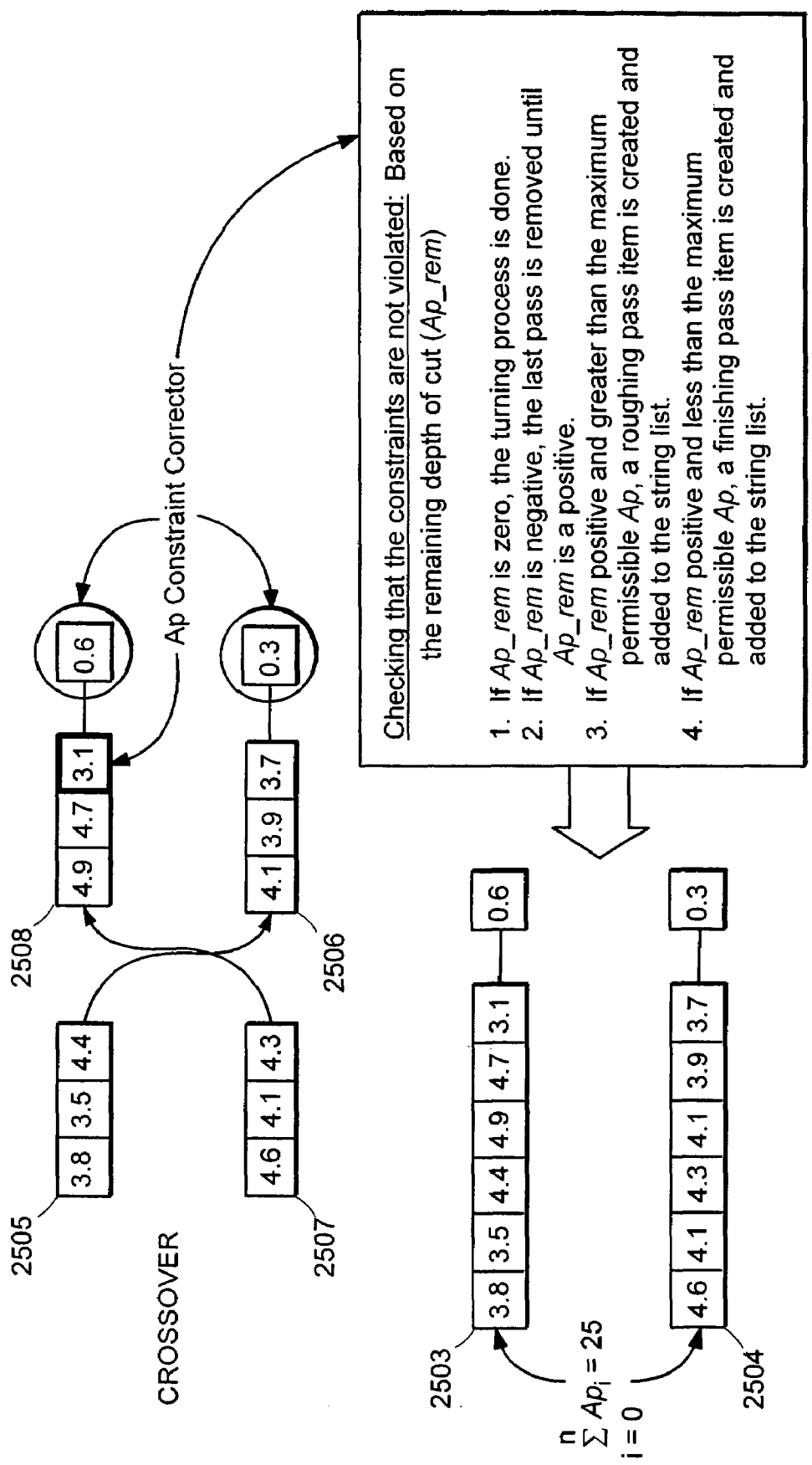
FIG. 25 illustrates a crossover genetic operation, in accordance with an embodiment of the invention.

One of the novel aspects of this implementation is that the passes in the form of strings are connected to each other dynamically through linked structures and a buffer pass is identified for the completion of the constraints after the genetic operator is performed (e.g. crossover), see FIG. 25. A double-linked list of processes (sublist) 2401 and passes (nodes) 2402 is used to achieve and manage the dynamic string length property, as shown in FIGS. 24*a* and 24*b*, in accordance with an embodiment of the invention.

A crossover operation is applied only if the number of passes in the genetic string is two or more. Since there is only one finishing pass, the crossover operator can exchange machining parameter values only in the roughing segment of the genetic string. FIG. 25 illustrates an example of the mechanics of a conventional percentage crossover operator with regard to a depth of cut string. After removing their finishing pass, strings 2501 and 2502 are randomly cut, such as by finding a random number between 0 and 1 and utilizing the random number as a percentage partition. The first part 2505 of string 2501 is then mapped to the second part 2506 of string 2502 to form new string 2503, and the first part 2507 of string 2502 is mapped to the second part 2508 of string 2501 to form new string 2504. Various constraints may then be checked to ensure validity of the partition. For example, if the remaining depth of cut is zero, the turning process is done; if the remaining depth of cut is negative, the last pass is removed until the remaining depth of cut is positive; if the remaining depth of cut is positive and greater than the maximum permissible remaining depth of cut, a roughing pass item is created and added to the string; and if the remaining depth of cut is positive and less than the maximum permissible cut, a finishing pass item is created and added to the string list. In preferred embodiments, this operation is performed only on the depth of cut strings, with the cutting speed and feed values associated with a particular depth of cut value translated accordingly. An example of a genetic operator is illustrated in more detail in Subbarao, 2002 and Schrader, 2003.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A method of automatically estimating the optimized cost of a part during the course of design of the part on a computer-aided design (CAD) system by a designer, the method comprising:
   extracting parametric features of a current design from the CAD system;
   identifying manufacturing cost drivers on the basis of the parametric features;
   translating manufacturing cost drivers into costs using process models;
   simultaneously optimizing costs with respect to a plurality of operations within specified machine constraints using an algorithm with dynamically linked Detached Linked Structures (DLS) to obtain estimates of optimized costs; and
   feeding back to the designer an estimate of optimized costs as an output display on an output device.

2. The method according to claim 1, wherein the step of translating manufacturing cost drivers into costs employs company specific cost data.

3. The method according to claim 1, further comprising a step of concurrently displaying a view of the part under design and a list of operant cost drivers.

4. The method according to claim 1, wherein the step of feeding back an estimate of costs includes displaying a current and any former estimate of costs.

5. The method according to claim 1, wherein the step of simultaneously optimizing costs includes using a genetic optimization algorithm.

6. The method according to claim 5, wherein a plurality of strings represent machining passes.

7. The method according to claim 6, wherein the strings are dynamically connected through linked structures.

8. The method according to claim 6, wherein the strings include at least one of a depth of cut string, a feed rate string, and a cutting speed string.

9. The method according to claim 8, further comprising a step of dividing each of the depth of cut string, the feed rate string, and the cutting speed string into roughing and finishing passes.

10. The method according to claim 5, further comprising a step of minimizing cost by means of the genetic optimization algorithm.

11. The method according to claim 5, wherein the step of simultaneously optimizing costs includes using at least one operator from the group of operators consisting of a crossover operator, a mutation operator, a delete operator, and a shuffle operator.

12. The method according to claim 1, wherein the step of simultaneously optimizing costs includes using a double list data structure having a pointer to a previous linked list data structure and a pointer to a next linked list data structure.

13. The method according to claim 1, wherein a DLS node includes a field indicating a relative position of the DLS node within a hierarchy.

14. The method according to claim 1, wherein a DLS node includes a field indicating a type of object associated with the node.

15. The method according to claim 1, wherein a DLS node includes a relative position of the node in a list having the same objects.

16. The method according to claim 1, wherein a DLS node includes a pointer pointing to one of a root, head, and tail.

17. The method according to claim 1, wherein a DLS node includes a pointer to a previous linked list data structure and a pointer to a next linked list data structure.

18. The method according to claim 1, wherein the step of simultaneously optimizing costs includes minimizing machining time.

19. The method according to claim 1, wherein the step of optimizing the machining process includes maximizing machine life.

20. A program storage device readable by a machine, tangibly embodying a program of instructions executable by the machine to perform a method for automatically estimating the optimized cost of a part during the course of design of the part on a CAD system by a designer, the method comprising:
   extracting parametric features of a current design from the CAD system;
   identifying manufacturing cost drivers on the basis of the parametric features;
   translating manufacturing cost drivers into costs using process models;
   simultaneously optimizing costs with respect to a plurality of operations within specified machine constraints using an algorithm with dynamically linked Detached Linked Structures (DLS) to obtain estimates of optimized costs; and
   feeding back to the designer an estimate of optimized costs as an output display on an output device.

21. The program storage device according to claim 20, wherein the step of translating manufacturing cost drivers into costs employs company specific cost data.

22. The program storage device according to claim 20, wherein the step of feeding back an estimate of costs includes displaying a current and any former estimate of costs.

23. The program storage device according to claim 20, wherein the method further includes a step of concurrently displaying a view of the part under design and a list of operant cost drivers.

24. The program storage device according to claim 20, wherein the step of simultaneously optimizing costs further includes using a genetic optimization algorithm.

25. The program storage device according to claim 24, wherein a plurality of strings represent machining passes.

26. The program storage device according to claim 25, wherein the strings are dynamically connected through linked structures.

27. The program storage device according to claim 26, wherein the strings include at least one of a depth of cut string, a feed rate string, and a cutting speed string.

28. The program storage device according to claim 27, wherein the method further includes the step of dividing each of the depth of cut string, the feed rate string, and the cutting speed string into roughing and finishing passes.

29. The program storage device according to claim 24, wherein the method further includes a step of minimizing cost by means of the genetic optimization algorithm.

30. The program storage device according to claim 24, wherein the step of simultaneously optimizing costs includes using at least one operator from the group of operators consisting of a crossover operator, a mutation operator, a delete operator, and a shuffle operator.

31. The program storage device according to claim 20, wherein the step of simultaneously optimizing costs includes using a double list data structure having a pointer to a previous linked list data structure and a pointer to a next linked list data structure.

32. The program storage device according to claim 20, wherein a DLS node includes a field indicating a relative position of the DLS node within a hierarchy.

33. The program storage device according to claim 20, wherein a DLS node includes a field indicating a type of object associated with the node.

34. The program storage device according to claim 20, wherein a DLS node includes a relative position of the node in a list having the same objects.

35. The program storage device according to claim 20, wherein a DLS node includes a pointer pointing to one of a root, head, and tail.

36. The program storage device according to claim 20, wherein a DLS node includes a pointer to a previous linked list data structure and a pointer to a next linked list data structure.

37. The program storage device according to claim 20, wherein the step of simultaneously optimizing costs includes minimizing machining time.

38. The program storage device according to claim 20, wherein the step of simultaneously optimizing costs includes maximizing machine life.

39. A system for automatically estimating the optimized cost of a part during the course of design of the part on a computer-aided design (CAD) system by a designer, the system comprising:
    means executed by a processor for extracting parametric features of a current design from the CAD system;
    means executed by a processor for identifying manufacturing cost drivers on the basis of the parametric features;
    means executed by a processor for translating manufacturing cost drivers into costs using process models;
    means executed by a processor for simultaneously optimizing costs with respect to a plurality of operations within specified machine constraints using an algorithm with dynamically linked Detached Linked Structures (DLS) to obtain estimates of optimized costs; and
    means executed by a processor for feeding back to the designer an estimate of optimized costs as an output display on an output device.

40. The system according to claim 39, wherein the translating means includes employing company specific cost data.

41. The system according to claim 39, wherein the means for feeding back an estimate of costs includes displaying a current and any former estimate of costs.

42. The system according to claim 39, further comprising a means executed by a processor for concurrently displaying a view of the part under design and a list of operant cost drivers.

43. The system according to claim 39, wherein the means for simultaneously optimizing costs includes use of a genetic optimization algorithm.

44. The system in accordance with claim 43, wherein a plurality of strings represent machining passes.

45. The system in accordance with claim 44, wherein the strings are dynamically connected through linked structures.

46. The system in accordance with claim 45, wherein the strings include at least one of a depth of cut string, a feed rate string, and a cutting speed string.

47. The system in accordance with claim 46, wherein each of the depth of cut string, the feed rate string, and the cutting speed string is further divided into roughing and finishing passes.

48. The system in accordance with claim 43, further comprising a means executed by a processor of minimizing cost by means of the genetic optimization algorithm.

49. The system in accordance with claim 43, wherein the means for simultaneously optimizing costs includes using at least one operator from the group of operators consisting of a crossover operator, a mutation operator, a delete operator, and a shuffle operator.

50. The system in accordance with claim 39, wherein the means for simultaneously optimizing costs includes using a double list data structure having a pointer to a previous linked list data structure and a pointer to a next linked list data structure.

51. The system in accordance with claim 39, wherein a DLS node includes a field indicating a relative position of the DLS node within a hierarchy.

52. The system in accordance with claim 39, wherein a DLS node includes a field indicating a type of object associated with the node.

53. The system in accordance with claim 39, wherein a DLS node includes a relative position of the node in a list having the same objects.

54. The system in accordance with claim 39, wherein a DLS node includes a pointer pointing to one of a root, head, and tail.

55. The system in accordance with claim 39, wherein a DLS node includes a pointer to a previous linked list data structure and a pointer to a next linked list data structure.

56. The system in accordance with claim 39, wherein the means for simultaneously optimizing costs includes minimizing machining time.

57. The system in accordance with claim 39, wherein the means for optimizing the machining process includes maximizing machine life.

58. A computer program product for automatically estimating the optimized cost of a part during the course of design of the part on a computer-aided design (CAD) system by a designer, the computer program product comprising a computer usable medium having computer readable program code thereon, the computer readable program code comprising:
    program code for extracting parametric features of a current design from the CAD system;
    program code for identifying manufacturing cost drivers on the basis of the parametric features;
    program code for translating manufacturing cost drivers into costs using process models;
    program code for simultaneously optimizing costs with respect to a plurality of operations within specified machine constraints using an algorithm with dynamically linked Detached Linked Structures (DLS) to obtain estimates of optimized costs; and
    program code for feeding back to the designer an estimate of optimized costs as an output display on an output device.

59. The computer product according to claim 58, wherein the program code for translating manufacturing cost drivers includes program code employing company specific cost data.

60. The computer product according to claim 58, wherein the program code for feeding back an estimate of costs includes program code for displaying a current and any former estimate of costs.

61. The computer product according to claim 58, further comprising program code for concurrently displaying a view of the part under design and a list of operant cost drivers.

62. The computer product according to claim 58, wherein the program code for simultaneously optimizing costs includes program code for performing a genetic optimization algorithm.

63. The computer product according to claim 62, wherein the program code for performing a genetic optimization algorithm includes a plurality of strings representing machining passes.

64. The computer product according to claim 63, wherein the strings are dynamically connected through linked structures.

65. The computer product according to claim 64, wherein the strings include at least one of a depth of cut string, a feed rate string, and a cutting speed string.

66. The computer product according to claim 65, wherein each of the depth of cut string, the feed rate string, and the cutting speed string is further divided into roughing and finishing passes.

67. The computer product according to claim 62, wherein the program code for simultaneously optimizing costs includes program code for minimizing costs using the genetic optimization algorithm.

68. The computer product according to claim 62, wherein the program code for simultaneously optimizing costs includes program code having at least one operator from the group of operators consisting of a crossover operator, a mutation operator, a delete operator, and a shuffle operator.

69. The computer product according to claim 58, wherein the program code for simultaneously optimizing costs includes a double list data structure having a pointer to a previous linked list data structure and a pointer to a next linked list data structure.

70. The computer product according to claim 58, wherein the DLS includes a DLS node having a field indicating a relative position of the DLS node within a hierarchy.

71. The computer product according to claim 58, wherein the DLS includes a DLS node having a field indicating a type of object associated with the node.

72. The computer product according to claim 58, wherein the DLS includes a DLS node having a field indicating relative position of the node in a list having the same objects.

73. The computer product according to claim 58, wherein the DLS includes a DLS node having a pointer pointing to one of a root, head, and tail.

74. The computer product according to claim 58, wherein the DLS includes DLS node having a pointer to a previous linked list data structure and a pointer to a next linked list data structure.

75. The computer product according to claim 58, wherein the program code for simultaneously optimizing costs includes program code for minimizing machining time.

76. The computer product according to claim 58, wherein the program code for simultaneously optimizing costs includes program code for maximizing machine life.

* * * * *